United States Patent [19]
Engle

[11] Patent Number: 6,031,594
[45] Date of Patent: Feb. 29, 2000

[54] ELECTRO-OPTIC DEVICE

[76] Inventor: Craig D. Engle, 336 Cline Ave., Griffith, Ind. 46319

[21] Appl. No.: 09/041,170

[22] Filed: Mar. 12, 1998

[51] Int. Cl.[7] .................. G02F 1/1333; G02F 1/1335; G02F 1/133; G02F 1/13
[52] U.S. Cl. .................. 349/158; 349/5; 349/84; 349/31; 349/200
[58] Field of Search .................. 349/31, 84, 153, 349/158, 160, 200, 5

[56] References Cited

U.S. PATENT DOCUMENTS

| | | | |
|---|---|---|---|
| 2,429,420 | 10/1947 | McMaster | 117/54 |
| 2,602,032 | 7/1952 | Gaiser | 117/69 |
| 2,681,423 | 6/1954 | Auphan | 315/3 |
| 3,295,028 | 12/1966 | Argue et al. | 317/230 |
| 3,409,404 | 11/1968 | Fergason | 23/230 |
| 3,445,707 | 5/1969 | Gilvey et al. | 313/68 |
| 3,627,408 | 12/1971 | Fergason | 353/84 |
| 3,781,087 | 12/1973 | Nagasaki | 350/160 LC |
| 3,862,830 | 1/1975 | Stern | 65/58 |
| 3,866,313 | 2/1975 | Vih | 29/592 |
| 4,037,929 | 7/1977 | Bricot et al. | 350/160 LC |
| 4,116,544 | 9/1978 | Soref | 350/336 |
| 4,190,330 | 2/1980 | Berreman | 350/331 |
| 4,387,964 | 6/1983 | Arrazola et al. | 350/331 |
| 4,443,063 | 4/1984 | Nishiyama | 350/334 |
| 4,784,883 | 11/1988 | Chitwood et al. | 428/1 |
| 5,016,987 | 5/1991 | Smith, Jr. | 350/344 |
| 5,036,317 | 7/1991 | Buzak | 340/783 |
| 5,557,177 | 9/1996 | Engle | 315/366 |
| 5,867,243 | 2/1999 | Engle | 349/158 |

OTHER PUBLICATIONS

C. D. Engle, Electron Beam Addressed Liquid Crystal Cell, Ser. No. 08/699,511, filing date, Aug. 19, 1996.

J. R. Hasen, R. J. Schneeberger, Liquid Crystal Media for Electron Beam Recording, IEEE Transactions on Electron Devices, vol. ED–15, No. 11, Nov. 1968.

Viverito, Rilee and Slack, Oxide Film Deposition by an Improved Prolitic Decomposition Process, Ceramic Bulletin, vol. 54, No. 2, 1975.

James Kane and H. P. Schweizer, Chemical Vapor Deposition of Antimony–Doped Tin Oxide Films Formed from Dibutyl Tin Diacetate, J. Electrochem. Soc. Solid State Science and Technology, Feb. 1976 D.J. Gibbons, The Barrier Grid Storage Tube, Electronic Engineering, Oct. 1961.

D. J. Gibbons, The Barrier Grid Storage Tube, Electronic Engineering, Oct. 1961.

R. Gerbard–Multhaupt et al, Viscoelastic Spatial Light Modulators and Schlieren–Optical Systems for HDTV Projection Displays, SPIE vol. 1255 Large Screen Projection Displays II.

John L. Janning, Thin Film Surface Orientation for Liquid Crystals.

John William Strutt, Baron Rayleigh, Scientific Papers, vol. IV, 1892–1901.

*Primary Examiner*—William L. Sikes
*Assistant Examiner*—Tarifur R. Chowdhury

[57] ABSTRACT

A single hollow element (12) surrounds the cavity (72) lying between a first surface (36) and a second surface (312) of a liquid crystal cell (8). An inside side surface (20) of element (12) bounds a perimeter (43) of the first surface (36) and extends between the first surface (36) and an end surface (14) of the hollow element (12). The end surface (14) of the hollow element (12) contains an opening (28) formed by the cavity (72). The second surface (312) overlaps the end surface (14) and covers opening (28) to contain a liquid crystal material (129) in the cell (8).

11 Claims, 9 Drawing Sheets

ELECTRO-OPTIC DEVICE

BACKGROUND

1. Field of Invention

This invention relates to electro-optic cells and how to configure and fabricate electro-optic cells so as to enhance performance attainable in a variety of applications including image forming systems.

2. Prior Art

As well understood by those knowledgeable in the state of the art, the cell gap of a liquid crystal cell influences several performance characteristics related to cell operation. Display applications involving liquid crystal cells typically require the cells to possess a uniformly thin, flat layer of liquid crystal material sealed in a suitable environment in order to produce an image of satisfactory quality. Techniques utilized in the prior art to establish a uniformly thin flat layer of a liquid crystal material include the use of a gasket sandwhiched between a pair of opposing substrates. Utilizing a pair of substrates to overlap opposing surfaces of the gasket provides the necessary mechanical support to fix the cell gap to a value dependent upon the thickness of the gasket.

When utilizing a gasket to establish a cell gap, the gasket is limited to the periphery of the cell so as to avoid obstructing a wavefront interacting with the flat layer of liquid crystal material. Gaskets can therefore be classified as a hollow element. Due to the thinness requirement required from gaskets, gaskets lack rigidity. Examples of prior art electro optic cells which utilized gaskets include U.S. Pat. No. 3,862,830 to Stern, Jan. 28, 1975 and U.S. Pat. No. 3,781,087 to Nagasaki, Dec. 25, 1973. In U.S. Pat. No. 3,862,830, the gasket is designated as element 19 in FIGS. 1 and 2 and described in column 2, lines 6 thru 8. In U.S. Pat. No. 3,781,087 a gasket denoted as element 12 in FIG. 1 and is utilized to separate surfaces of opposing substrates.

As identified in the patent application submitted by Craig D. Engle, titled Electron Beam Addressed Crystal Cell, Ser. No. 08/699,511, filing date Aug. 19, 1996 electro-optic cells which utilize a gasket to influence the cell gap of a liquid crystal cell suffer from several complications which adversely effect cell performance. Undesirable effects associated with the use of gaskets include variations in the cell gap from cell to cell. This is attributed to the complications associated with manufacturing thin, flat gaskets.

As identified in the above cited patent application, gaskets are an example of a spacer technique which is a member of a broader class of spacer technology. The terminology "discrete spacer technology" was introduced in application Ser. No. 08/699,511 to describe components which assist in establishing a cell gap between a pair of opposing substrates of a cell and which are permanently added to the cell, but are not considered an integral part of either of the substrates. The language "discrete spacer technology" emphasizes the fundamental differences which exist between the prior art and the techniques identified in patent application Ser. No. 08/699,511 for establishing a cell gap.

Additional examples of the prior art which utilized a gasket to bound a hollow region existing between opposing substrates includes U.S. Pat. No. 4,443,063 to Mishiyama, Apr. 17, 1984. A gasket denoted as sealing element 10 is illustrated in FIG. 2, and FIGS. 4 thru 6. As is readily apparent from all relevant figures, sealing element 10 is sandwhiched between surfaces of an opposing pair of substrates. Accordingly, sealing element 10 is a discrete hollow spacer and the electro-optic cell of U.S. Pat. No. 4,443,063 will be afflicted by the undesirable aspects associated therewith.

As further identified in patent application Ser. No. 08/699,511, the use of microspheres distributed within the cell gap are a second example of discrete spacer technology. Use of microspheres distributed within the cell gap of a liquid crystal cell adversely effects image quality of a magnified image of the cell. Consequently, the use of microspheres with projection display devices is deemed undesirable. Examples of the prior art which utilized microspheres include U.S. Pat. No. 4,784,883, Nov. 15, 1988, to Chitwood et al.

Prior art devices exist which do not utilize discrete spacer technology to produce a uniformly thin flat layer of liquid crystal material. Such techniques include depositing a layer comprising a liquid crystal material on the single substrate. See for instance information contained in U.S. Pat. No. 3,409,404, Nov. 5, 1968 to Fergason and the article titled Liquid Crystal Media for Electron Beam Recording, by J. R. Hansen and R. J. Schneeberger, IEEE Transactions on Electron Devices, Vol. ED-15, No. 11, November 1968. The approaches described in the above references suffer from the fact that the thickness of the flat layer of liquid crystal material is dependent upon the properties of the liquid crystal material and/or the liquid crystal is not provided a hermetically sealed environment. Such limitations could require a sequence of operations which are incompatible with the implementation of various addressing mechanisms necessary to operate the cell.

Limitations of discrete spacer technology are noted in U.S. Pat. No. 4,166,544 to Soref, Sep. 26, 1978. U.S. Pat. No. 4,116,544 identifies a spacer technique comprising a plurality of mesas formed on a substrate. Although mesas improves the control over the separation gap in liquid crystal cells as compared to the more conventional gasket, such an approach requires relatively complicated processing steps to implement.

U.S. Pat. No. 5,016,987 to Smith Jr. May 21, 1991 describes an approach which involves the use of three substrates to seal a uniformly thin flat layer of liquid crystal material. U.S. Pat. No. 5,016,987 requires a large number of complementary surfaces to be fabricated on each of the three substrates and as a consequence, is a relatively complicated device to fabricate. This is attributed to the requirement that each of the opposing pair of substrates are inserted within an deformable annulus which contains a chevron profile.

Additional applications which utilize liquid crystal cells include optical focusing systems. See for instance U.S. Pat. No. 4,037,929 to Bricot et al, Jul. 26, 1977, and U.S. Pat. No. 4,190,330 to Berreman, Feb. 26, 1980. Applications which involve a cell functioning as a lens require variations in the optical path length of a wavefront which traverses the cell to be a well behaved function of the cell's aperture. Consequently, the nature of the addressing mechanism which applies electric fields to the cell and/or the cell shape must be implemented in a manner to accommodate such a functional relationship. See for instance information in U.S. Pat. No. 4,190,330, column 4, lines 12 to lines 22.

Applications which involve cells functioning as spatial light modulators and form an image of the uniformly thin, flat layer of liquid crystal material impose no such constraints. Accordingly, a need exists for a technique which establishes a uniformly thin, flat cell gap in electro-optic cells and which eliminates the undesirable aspects associated with the use of discrete spacer technology.

OBJECTS AND ADVANTAGES

Accordingly, several objects and advantages of my invention are

1) To identify liquid crystal cell configurations which eliminate the need for discrete spacer technology and which are compatible with a variety of addressing mechanisms.

2) To identify how my invention can improve the performance attainable in projection display applications.

3) To identify techniques for forming an image of a uniformly thin flat layer of liquid crystal material contained in a cell.

4) To identify techniques for fabricating a hollow region in a substrate consistent with requirements for producing a uniformly thin, flat layer of liquid crystal material.

5) To identify how to configure a plurality of substrates to bound a hollow region formed in one of the substrates consistent with requirements for producing a uniformly thin, flat layer of liquid crystal material.

6) To identify how to bound a hollow region existing between a pair of opposing substrates in a manner which enhances uniformity of the cell gap from cell to cell and the image quality of images formed with the cell.

7) To identify the advantages of eliminating the use of discrete spacer technology with electro-optic cells.

8) To identify several electro-optic materials that can be utilized in the cell gap of my invention.

Further objects and advantages of my invention will become apparent from a consideration of the drawings and ensuing description of it.

DESCRIPTION OF DRAWINGS

Certain figures have been distorted and/or the scale greatly exaggerated to emphasize certain aspects of my invention. In the drawings, closely related figures have the same number but different alphabetic suffixes.

DESCRIPTION OF INVENTION

Figure 1:
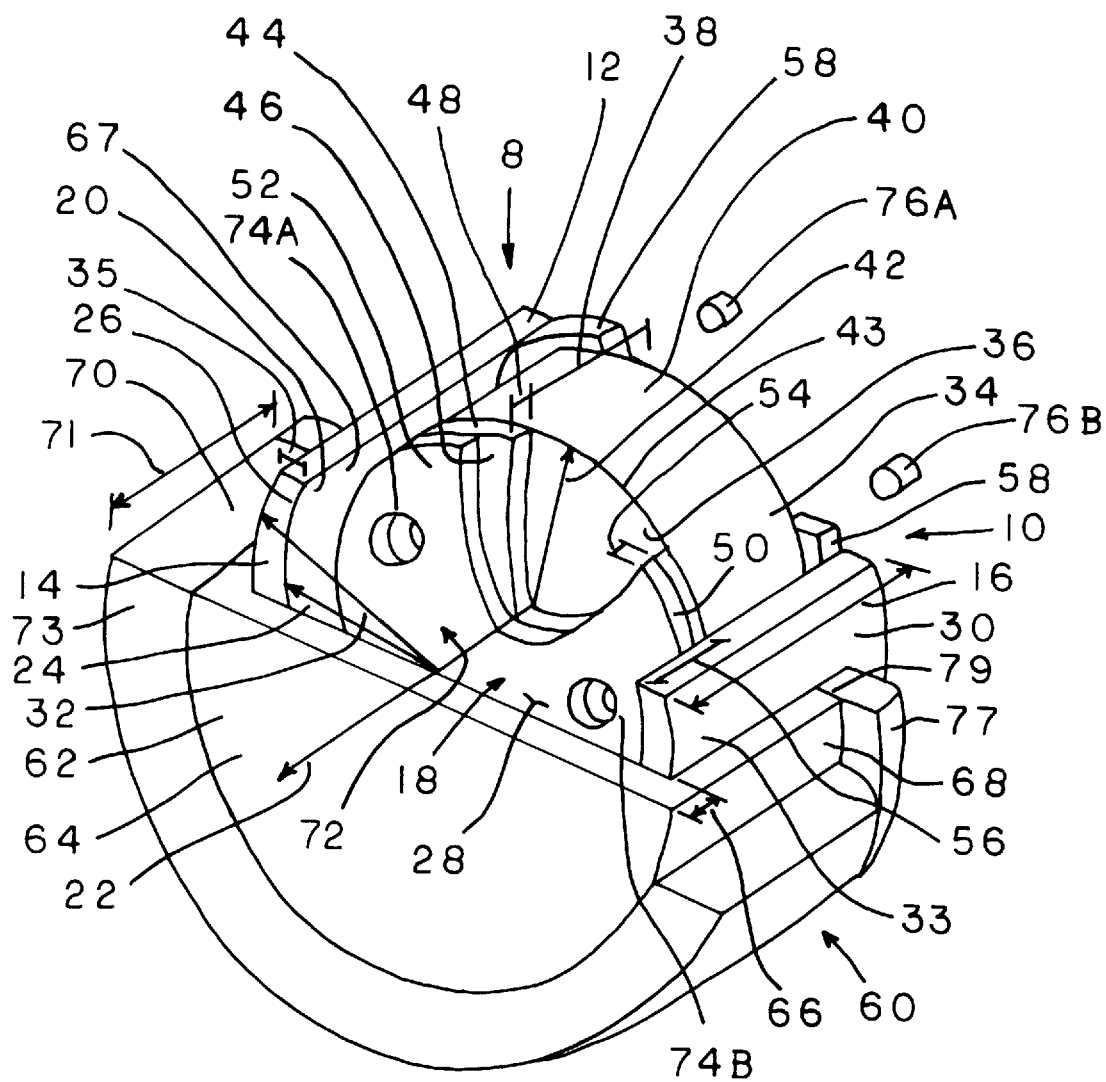
FIG. 1 shows a perspective view of a liquid crystal cell formed from a composite arrangement of substrates.

FIG. 1 shows a perspective view of a liquid crystal cell 8. Cell 8 further includes a faceplate assembly 10. Portions of the figure have been shown cutaway to reveal certain aspects and/or facilitate discussion of my invention. Assembly 10 comprises a hollow cylinder 12. Cylinder 12 further comprises a first end surface 14 essentially parallel to and separated from a second end surface by a thickness 16. The second end surface of cylinder 12 is not visible in the figure. Surface 14 may be formed on cylinder 12 by lapping and/or polishing operations. Surface 14 is processed to be extremely flat and/or smooth. As to be shown herein, such a consideration is fundamental to establishing a uniformly thin, flat layer of liquid crystal material in cell 8. Materials suitable for use as cylinder 12 includes glass. Additional materials suitable for use as cylinder 12 include metals and/or ceramics. Cylinder 12 is a rigid, nondeformable element.

Cylinder 12 contains a hollow region 18 extending from surface 14 to the second end surface of cylinder 12. Region 18 is bound by an inside side surface 20 formed on cylinder 12. Surface 20 is separated from an axis of revolution 22 of cylinder 12 by an inside radius 24. Surface 20 intersects surface 14 forming a perimeter 26 which bounds an opening 28 formed in surface 14 by region 18. Surface 20 intersects the second end surface of cylinder 12 forming a second perimeter which bounds a second opening formed in the second end surface of cylinder 12 by region 18. The second perimeter and the second opening in the second end surface of cylinder 12 are not visible in the figure.

Cylinder 12 further includes an outside surface 30. Surface 30 is separated from axis 22 by an outside radius 32. The difference between radius 24 and radius 32 establishes a side wall 33 possessing a width 35. Techniques for fabricating a hollow cylinder includes extruding a glass tube, casting, and/or core drilling a suitable substrate of material. Fabricating a hollow cylinder forms an inside side surface which enables the wall of the cylinder to function as a flank to bound the hollow region. Wall 33 surrounds region 18.

Cell B further includes a faceplate 34 inserted into region 18. Faceplate 34 is an optically transparent solid cylinder containing an axis of revolution. Faceplate 34 is positioned relative to cylinder 12 so the axis of revolution of faceplate 34 coincides with axis 22. The axis of revolution of faceplate 34 is not explicitly shown in the figure.

Faceplate 34 further includes a first surface 36 essentially parallel to and separated from a second surface of faceplate 34 by a faceplate thickness 38. Faceplate 34 further includes an exterior side surface 40 separated from axis 22 by a radius 42. The second surface of faceplate 34 is not visible in the figure. Surface 36 is processed to be extremely flat by any conventional means, such as lapping and/or polishing. Surface 40 intersects surface 36 forming a perimeter 43 which bounds the lateral extent or breadth of surface 36 to radius 42. Faceplate 34 is a rigid, nondeformable element.

An optically transparent electrically conducting electrode 44 is applied to and covers surface 36 of faceplate 34.

Electrode 44 further includes a first surface 46 essentially parallel to and separated from a second surface by a electrode thickness 48. The second surface of electrode 44 is in contact with surface 36. The second surface of electrode 44 is not visible in the figure. Techniques for establishing external electrical contact to electrode 44 will be described herein. Materials suitable for use as electrode 44 include tin oxide.

Techniques for applying a tin oxide coating to a faceplate include dipping the substrate in a suitable solution of stannic chloride. Additional techniques include the pyrolitic decomposition of oxide films and chemical vapor deposition of tin oxide films. See for instance information in U.S. Pat. No. 2,602,032 to R. A. Gaiser, Jul. 1, 1952, U.S. Pat. No. 2,429,420 to H. A. McMaster, Oct. 21, 1947, and the articles titled "Oxide Film Deposition by an Improved Pyrolitic Decomposition Process" by Viverito et al, Ceramic Bulletin, Vol. 54, No.2, 1975, and "Chemical Vapor Deposition of Antimony-Doped Tin Oxide Films Formed from Dibutyl Tin Diacetate" by Kane et al, J. Electrochemical Society, February 1976, p270.

Affixed to surface 46 of electrode 44 is a liquid crystal alignment layer 50. Layer 50 further includes a first surface 52 separated from a second surface of layer 50 by a layer thickness 54. Materials suitable for use as layer 50 includes SiO and MgF. Layer 50 is processed to produce parallel alignment of liquid crystal materials in cell 8. The second surface of layer 50 is in contact with surface 46 of electrode 44. The second surface of layer 50 is not visible in the figure.

Radius 42 is selected to be less than radius 24 so faceplate 34 may be inserted into cylinder 12 either through opening 28 or the opening in the second end surface of cylinder 12. As to be more fully described herein, the separation between surface 40 and surface 20 due to differences in radius 24 and radius 42 is best seen from the view of FIG. 2.

Returning to FIG. 1, faceplate 34 is inserted into cylinder 12 using a manufacturing technique which enables surface 36 to be offset from surface 14 by a cell gap 56 and which maintains surface 36 parallel to surface 14. Such techniques are essential for establishing a uniformly thin flat layer of liquid crystal material for use in cell 8.

Faceplate 34 is affixed to cylinder 12 by a solder glass fillet 58. Fillet 58 is in contact with the second surface of faceplate 34 and is formed around surface 20 of cylinder 12 thereby providing a vacuum seal between faceplate 34 and cylinder 12. Techniques for processing solder glass to enable the solder glass to form a vacuum seal are well understood by those knowledgeable in the state of the art. Fillet 58 enables faceplate 34 to be rigidly affixed to cylinder 12.

Figure 2:
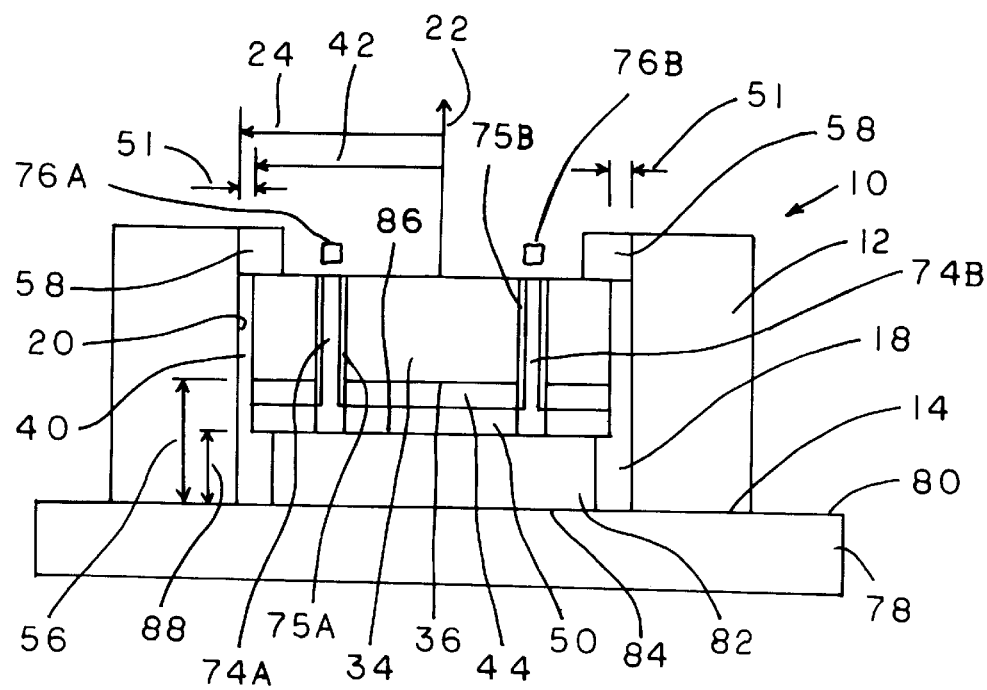
FIG. 2 shows a technique for setting a cell gap in a liquid crystal cell formed from a composite arrangement of substrates.

FIG. 2 shows a cross sectional view of a fabrication technique which can be utilized to affix faceplate 34 to cylinder 12 in a manner which offsets surface 36 from surface 14 by gap 56 and maintains surface 36 parallel to surface 14 thereby enabling a liquid crystal material introduce into a cavity formed with assembly 10 to produce a uniformly thin flat layer of liquid crystal material which is hermetically sealed.

FIG. 2 shows a work bench 78. Bench 78 further includes a flat, highly smooth work surface 80. Surface 14 of cylinder 12 is placed in contact with surface 80. Affixed to surface 80 is a reference gauge plug 82. Plug 82 further includes a first surface 84 in contact with surface 80 and a second surface 86 essentially parallel to and separated from surface 84 by a plug thickness 88. Thickness 88 is perpendicular to surface 80.

Techniques for affixing plug 82 to surface 80 of bench 78 could include vacuum techniques. Several small holes could be drilled in bench 78 to assist in establishing a vacuum force to firmly hold plug 82 to surface 80. Such small holes and the necessary pumping equipment are not shown in the figure for convenience. Surface 80 and surface 86 are highly parallel surfaces.

Plug 82 can be formed by a variety of techniques which includes affixing a cleaved piece of mica to surface 80. Alternative techniques include depositing thin film layers on surface 80 to the desired thickness. Utilizing the information provided therein, such techniques will become obvious to those knowledgeable in the state of the art. Alternatively, a thin metal foil may be utilized for plug 82.

Cylinder 12 is placed on bench 78 relative to plug 82 so plug 82 protrudes into region 18 of cylinder 12 and surface 14 of cylinder 12 is parallel to and in contact with surface 80. Next, faceplate 34 is inserted into region 18 from the opening in the second surface of cylinder 12 with surface 36 facing plug 82. Prior to inserting faceplate 34 into hole 30, electrode 44 and layer 50 are applied to faceplate 34. Fabricating a liquid crystal cell from a composite of substrates enables concurrent processing steps to be applied to each component forming the cell. This latitude facilitates high volume manufacturing.

Faceplate 34 is positioned toward surface 86 of plug 82 along cylinder 12 until layer 50 contacts plug 82 thereby inhibiting further motion of faceplate 34. This is the relative condition portrayed in FIG. 2. After faceplate 34 establishes a stationary position attributed to plug 82, faceplate 34 is then bonded by cylinder 12 with fillet 58. Use of plug 82 to prevent motion of faceplate 34 at a distance related to thickness 88 enables gap 56 to be established between surface 14 and surface 36 since surface 14 and surface 86 are both referenced to surface 80. Gap 56 is related to thickness 88. Although fillet 58 has been described as a solder glass, epoxies and/or cements may be utilized as well. Utilizing the information herein, alternatively materials which can be utilized with my invention will become obvious to those knowledgeable in the state of the art.

Due to radius 42 being less than radius 24, a separation distance 51 exists between surface 40 and surface 20. Fillet 58 covers distance 51 enabling a vacuum seal to be maintained between faceplate 34 and cylinder 12.

Use of my invention enables a convenient means to affix faceplate 34 to cylinder 12 so that gap 56 associated with each liquid crystal cell 8 is traceable to a single spacer attributed to plug 82. Such techniques are essential for establishing a consistent, cost effective cell gap manufacturing technique for liquid crystal cells.

After affixing faceplate 34 to cylinder 12, cylinder 12 is removed from work bench 78 to enable completion of the liquid crystal cell. These additional processing steps are not shown in FIG. 2. As to be more fully described herein, my invention eliminates the use of discrete spacer technology such as gaskets and/or microspheres. By eliminating the need for a discrete spacer technology in the cell, my invention enhances performance characteristics associated with cell operation and/or image quality attributed to the cell.

Returning to FIG. 1, cell 8 further includes a backplate assembly 60. Assembly 60 further includes a second substrate 62. Substrate 62 contains a first surface 64 essentially parallel to and separated from a second surface of substrate 62 by a substrate thickness 66. The second surface of substrate 62 is not visible in the figure. Materials suitable for use as a second substrate include Mylar. Mylar is a registered tradename of the DuPont corporation Wilmington Del. As to be shown herein, a wide variety of backplane configurations are compatible with my invention. Accordingly, additional materials which could be utilized for the substrate in the backplane assembly of my invention includes glass, mica, polystyrene, and Kapton. Kapton is a registered trademark of the DuPont corporation, Wilmington, Del. Material characteristics which are desirable for substrate 62 to possess, for electron beam addressed versions of my invention, include a secondary electron emission ratio which exceeds unity.

Substrate 62 is positioned relative to cylinder 12 so the second surface of substrate 62 is in contact with surface 14 of cylinder 12. In addition, substrate 62 covers opening 28 in surface 14. Portions of substrate 62 have been shown cutaway for clarity. Substrate 62 further includes a folder portion 68 which is formed around surface 30 of cylinder 12. Substrate 62 is stretched in forming portion 68 so as to create tension in substrate 62 to maintain the second surface of substrate 62 parallel to and in contact with surface 14. A locking ring 70 is utilized to secure portion 68 of substrate 62 to surface 30 thereby preserving the tension state in substrate 62 and parallelism of the second surface of substrate 62 with surface 14. Ring 70 is shown cutaway for clarity. The use of locking rings to assist in affixing a flexible substrate to a side surface of a cylinder are well understood by those knowledgeable in the state of the art. See for instance information contained in the article titled "Liquid Crystal Media for Electron Beam Recording" by J. R. Hansen and R. J. Schneeberger, IEEE Transactions on Electron Devices Vol. Ed-15 No. 11, November 1968.

Maintaining parallelism between surface 14 and the second surface of substrate 62 establishes parallelism between surface 36 and the second surface of substrate 62. Such a relationship is essential for establishing a uniformly thin flat layer of liquid crystal material in cell 8. The liquid crystal material is not shown in the figure for convenience.

Offsetting surface 36 from surface 14 establishes a cavity 72 for containing a liquid crystal material in cell 8. Cavity 72 comprises the volume of space extending between opening 28 and surface 36 and surrounded by surface 20. An annulus 67 is the portion of cylinder 12 which lies between surface 14 and surface 36. Despite the small thickness of annulus 67, which is gap 56, my invention enables cylinder 12 to function in a manner similar to a collet and/or flange to establish a rigid cell gap between opposing surfaces of a liquid crystal cell. This is in contradistinction to the use of thin gaskets which lack the rigidity of my invention. Gap 56 is parallel to thickness 16. As to be identified herein, the thickness of layer 50 and electrode 44 are significantly less than gap 56. Accordingly, the volume of cavity 72 may be approximated by the following product of terms:

Volume=(Pi)×(radius 24)×(radius 24)×(gap 56)

Where Pi can be approximated by the value of 3.14159.

Establishing the second surface of substrate 62 to be parallel to surface 36 establishes a uniformly thin flat volume of space in cavity 72 which overlaps surface 36 thereby providing the necessary boundary conditions for containing a uniformly thin flat layer of liquid crystal material in cell 8. Covering opening 28 with the second surface of substrate 62 enables a liquid crystal material to be contained in cavity 72 of cell 8.

A pair of fill channels 74 extending from the second surface of faceplate 34 thru surface 52 of layer 50 are utilized to fill cavity 70 with a liquid crystal material. The liquid crystal material is not shown in the figure for convenience. Any type of liquid crystal material may be utilized with cell 8, and includes nematic phase, cholesteric phase and sematic phase liquid crystal materials. After filling cavity 70 with a liquid crystal material, a pair of malleable metal plugs 76A and 76B are utilized to seal each channel 74. Techniques for filling a cavity with a liquid crystal material and plugging fill channels with a malleable metal to assist in containing a liquid crystal material in the cavity are well understood by those knowledgeable in the state of the art. See for instance information in U.S. Pat. No. 3,866,313 to Yih, Feb. 18, 1975.

In addition, fill channels 74 assist in providing an electrical feedthrough through faceplate 34 to enable external electrical contact to electrode 44. In using the fuming process identified in U.S. Pat. No. 2,429,420 to McMaster, I have noticed that the fumes coat the interior surfaces of channels 74, and accordingly provide a very convenient technique for forming a electrical feedthrough in faceplate 34. The feedthroughs are not shown in FIG. 1. Turning attention to FIG. 2, an electrical feedthrough 75 shown as a lining in channels 74, is provided in each channel 74A and 74B to provide a convenient exterior electrical contact to electrode 44. Since layer 50 is added after fabrication of electrode 44, feedthroughs 75 do not extend into layer 50. Plugs 76A and 76B are electrically conductive to assist in providing electrical contact to feedthroughs 75. Materials suitable for plugs include indium. As to be more fully described herein, alternatives to the use of this technique include coating all exterior surfaces of the faceplate with the above described fuming process to provide a continuous conductive coating around the faceplate. I have encapsulated faceplates in conductive coatings utilizing the fuming process described by U.S. Pat. No. 2,429,420 and found them to perform in a very satisfactory manner. Filling of the cell can be accomplished by "painting" the liquid crystal in the cavity. Accordingly, fill channels and feedthroughs are not essential.

Returning to FIG. 1, ring 70 further includes a first end surface 73 separated from a second end surface by a ring thickness 71. The second end surface of ring 70 is not visible in the figure. As to be further identified herein, surface 73 may be coated with indium and utilized to assist in establishing a vacuum seal to an electron tube abutted against surface 73. The electron tube and indium seal are not shown in this figure for convenience. Utilizing the information identified herein, such techniques will become obvious to those knowledgeable in the state of the art. A seal member 77 is formed around surface 30 and the second surface of ring 70 thereby overlapping an edge 79 of portion 68 to form a vacuum seal. Materials suitable for use as member 77 includes epoxies.

As can be readily seen from the description of FIG. 1, by selecting radius 24 to be greater than radius 42, faceplate 34 is allowed to be inserted within region 18 of cylinder 12. This enables surface 20 of cylinder 12 to circumscribe perimeter 43 of faceplate 34. Enabling surface 20 of cylinder 12 to circumscribe perimeter 43 avoids the pitfalls of the prior art by providing the freedom necessary to permit surface 36 to be offset from surface 14 parallel to thickness 16 of cylinder 12 in a manner which is independent of thickness 16 of cylinder 12. This freedom eliminates the need for discrete spacer technology. Requiring surface 20 to circumscribe surface 36 precludes surface 36 from overlapping the second end surface of cylinder 12. This precludes the thickness of annulus 67 which bounds cavity 72 of my invention from influencing the separation of opposing surfaces of the liquid crystal cell of my invention. This is in contradistinction to the prior art which utilizes gaskets including U.S. Pat. No. 4,443,063 to Nishiyama, Apr. 17, 1984.

Since the second surface of substrate 62 is in contact with surface 14, gap 56 is also the separation between surface 36 and the second surface of substrate 62, i.e. opposing surfaces of cell 8. Consequently, the separation between the second surface of substrate 62 and surface 36 may be set to a value independent of thickness 16. Since cylinder 12 is a single, rigid hollow element formed from a continuum of material, and surrounds one of the opposing end surfaces of the cavity, cylinder 12 can possess the mechanical rigidity necessary to maintain the integrity of cell gap 56 of cell 8.

Figure 3:
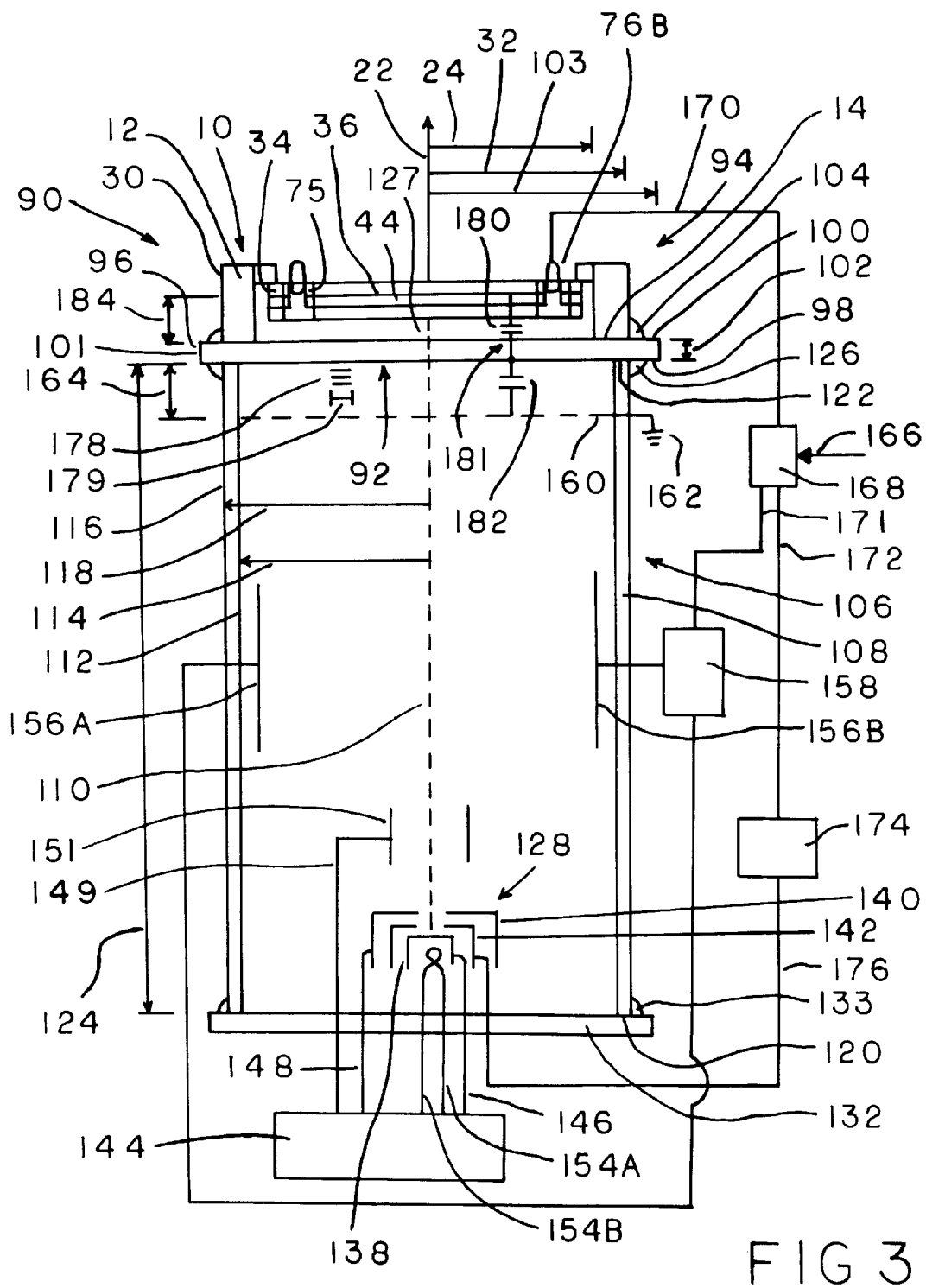
FIG. 3 shows a liquid crystal spatial light modulator which utilizes electron beam addressing to apply electric fields to a uniformly thin, flat layer of liquid crystal material contained in a cell.

FIG. 3 shows a liquid crystal spatial light modulator 90. Modulator 90 further includes faceplate assembly 10 affixed to a backplane assembly 92 to form a liquid crystal cell 94. Backplane assembly 92 and cell 94 are given different designations from what has been utilized in previous figures to emphasize the latitude available in my invention for fabricating liquid crystal cells. Assembly 92 further includes a substrate 96. Substrate 96 further includes a first surface 98 essentially parallel to and separated from a second surface 100 by a substrate thickness 102. Materials suitable for use as substrate 96 includes mica. Surface 100 is in contact with surface 14 of cylinder 12. Substrate 96 further includes a side surface 101 separated from axis 22 by an outside radius 103.

Assembly 92 further includes a second solder glass fillet 104 utilized to affix substrate 96 to cylinder 12. Fillet 104 is formed around surface 30 of cylinder 12 and is in contact with surface 100 to form a vacuum seal between substrate 96 and assembly 10. Techniques for processing a fillet formed from a solder glass to achieve a vacuum seal are well understood by those knowledgeable in the state of the art and details of processing fillets are not described in detail.

Modulator 90 further includes an electron beam addressing mechanism 106 for applying localized electric fields to cell 94 in accordance with an information bearing signal. Mechanism 106 further includes a vacuum tube 108. Tube 108 is a hollow cylinder. Tube 108 further includes an axis of revolution 110. Tube 108 further includes an inside surface 112 separated from axis 110 by an inside radius 114. Tube 108 further includes an outside surface 116 separated from axis 110 by an outside radius 118.

Tube 108 further includes a first end surface 120 separated from a second end surface 122 by a length 124. Length 124 is parallel to axis 110. Surface 120 is parallel to surface 122 and perpendicular to axis 110.

Tube 108 is positioned relative to assembly 10 of cell 94 so axis 22 is collinear with axis 110. In addition surface 122 is in contact with surface 98 of substrate 96. Assembly 92 further includes a third solder glass fillet 126 to affix substrate 96 to tube 108. Fillet 126 is a solder glass formed around surface 116 and in contact with surface 98 so when properly processed will form a vacuum seal between cell 94 and tube 108.

Radius 114 is selected to be equal to or greater than radius 24 but less than radius 32. Radius 118 is selected to be equal to radius 32. This enables surface 14 to provide mechanical backing to surface 100 when surface 122 contacts surface 98 of substrate 96. In addition, the coefficient of thermal expansion of cylinder 12 and tube 108 are selected to be greater than the coefficient of thermal expansion of substrate 96. This enables a radial tension to be established in substrate 96 after fillet 104 and fillet 126 are processed thru a heating and cooling cycle to seal substrate 96 to cylinder 12 and tube 108. Such considerations are well understood by those knowledgeable in the state of the art. See for instance information in U.S. Pat. No. 3,445,707 to Gilvey et al, May 20, 1969.

Establishing a radial tension in substrate 96 enables substrate 96 to conform to surface 14. This enables surface 100 to be parallel to surface 36 enabling a cavity 127 formed in assembly 10 to contain a uniformly thin flat layer of liquid crystal material in cavity 127. The liquid crystal material is not shown in the figure. The liquid crystal material is preferably a cholesteric phase liquid crystal material.

Mechanism 106 further includes an electron gun assembly 128 for generating an electron beam. The electron beam is not shown in the figure for convenience. Electrons gun assemblies are well understood by those knowledgeable in the state of the art and consequently assembly 128 is not shown in detail. Assembly 128 further includes a support 132 sealed to surface 120 by a fourth fillet 133. Assembly 128 further includes a cathode 138, an anode 140, a control grid 142 and a focusing element 151. Mechanism 106 further includes a power supply 144 for applying a first voltage 146 to cathode 138. Supply 144 applies a second voltage 148 to anode 140. Supply 144 applies a third voltage 149 to a focusing mechanism 151. Supply 144 is electrically connected to a heater filament 154 to assist cathode 138 in generating an electron beam.

Mechanism 106 further includes an electron beam deflection means 156 electrically connected to a deflection amplifier 158. Mechanism 106 further includes an electron collector mesh 160 electrically connected to a ground potential 162. Mesh 160 is separated from surface 98 by a distance 164. The function of mesh 160 is to collect secondary electrons emitted from substrate 96 in response to the electron beam bombarding substrate 96. The voltages applied to mechanism 106 by supply 144 are selected relative to ground potential 162 and the peak in the curve of the secondary electron emission ratio versus primary electron energy for the material utilized for substrate 96 to implement a high velocity mode of equilibrium writing with mechanism 106. Such considerations are well understood by those knowledgeable in the state of the art and consequently are not shown in detail.

To implement a high velocity mode of equilibrium writing with modulator 90, the potential difference existing between signal 146 applied to cathode 138 and signal 148 applied to anode 140 is selected so electrons emitted from cathode 138 are accelerated to a primary energy which enables electrons in the electron beam striking surface 98 to produce a secondary electron emission ratio which exceeds unity. As well understood by those knowledgeable in the state of the art, this enables the potential difference applied between electrode 44 and mesh 160 to influence the amount of electronic charge which is deposited on surface 98 by the electron beam.

An information bearing signal 166 is applied to a video amplifier 168. Amplifier 168 applies a potential signal 170 to plug 76 which is electrically connected to electrode 44 by feedthrough 75 to develop a potential difference between mesh 160 and electrode 44. Amplifier 168 also applies a first synchronization signal 171 to deflection amplifier 158 to synchronize the potential difference applied between electrode 44 and mesh 160 with the position of electron beam on surface 98. Amplifier 168 develops waveforms which when applied to deflection means 156 results in the electron beam scanning surface 98 in a raster format.

Amplifier 168 applies a second synchronization signal 172 to a control grid amplifier 174. Amplifier 174 applies a beam current control signal 176 to grid 142 of assembly 128 to control the beam current of the electron beam generated by assembly 128. During either horizontal and/or vertical blanking intervals the signal 176 applied to grid 142 is selected to extinguish the electron beam. During the active interval of active horizontal lines, the signal 176 applied to grid 142 is selected to establish a beam current which facilitates the instantaneous location of surface 98 being bombarded with electrons to approach an equilibrium potential relative to mesh 160. Such considerations are well understood by those knowledgeable in the state of the art and accordingly, are not shown in detail. See for instance information in the references cited herein.

The location of the electron beam on surface 98 is varied with time by deflection means 156 to produce a raster format on surface 98. The location of the beam on surface 98 at any particular instant in time is localized to a small spot limited in spatial extent due to focusing means 151 focusing the electron beam on surface 98.

As identified in the reference titled "The Barrier Grid Storage Tube" by D. J. Gibbons, Electronic Engineering, October 1961, a convenient way of visualizing an elemental area on a surface being bombarded with a scanning electron beam is to assume that it is the area beneath the beam spot. Accordingly, each elemental area on surface 98 which is bombarded by the scanning electron beam will form a respective pixel capacitance 180 with electrode 44. Capacitance 180 is illustrated in a schematic fashion to facilitate discussion purposes. In addition each elemental area on surface 98 which is bombarded by the scanning electron beam will form a respective capacitance 182 with mesh 160. Each elemental area on surface 98 and the corresponding portion of cell 94 which overlaps the elemental area, including the portion of the layer of liquid crystal material which contributes to the value of capacitance 180, is designated as a cell pixel 181.

As well understood by those knowledgeable in the state of the art, the elemental area of surface 98 which coincides with the instantaneous location of the electron beam will tend to stabilize to an equilibrium potential relative to ground 162 applied to mesh 160 by the secondary emission charging action of the electron beam against the action of the instantaneous potential applied to electrode 44. As a result, each elemental area on surface 98 bombarded by the electron beam, and hence the corresponding pixel 181 will acquire an electronic charge 178, denoted with horizontal dashes and limited in spatial extent to a diameter 179, dependent on signal 166 at the instant when the elemental area is bombarded with electrons from the scanning beam.

Charge 178 deposited at each elemental area on surface 98 establishes a localized electric field 184 in the corresponding pixel 181 formed by the elemental area. The amount of charge 178 deposited at each elemental area on surface 98 influences the magnitude of the corresponding field 184. Field 184 is shown as bidirectional to indicated that either positive and/or negative polarities of signal 166 relative to ground 162 may be applied to electrode 44.

As to be more fully described herein, varying localized electric fields 184 by varying signal 166, varies a property of the liquid crystal material in the portion of the layer of liquid crystal material which overlaps the charge 178 related to the electric field 184. Varying a property of the liquid crystal material will vary a property of an electromagnetic wavefront which interacts with the layer of liquid crystal material. Relationships involving liquid crystal properties and the influence that these properties have on an electromagnetic wavefront for a variety of liquid crystal materials are well understood by those knowledgeable in the state of the art. The wavefront is not shown in the figure for convenience.

Variations between adjacent localized electric fields 184 across surface 36 are also related by signal 166. This is in contradistinction to liquid crystal cells utilized as lens elements in focusing applications. Use of my invention imposes no restrictions on the spatial relationship of adjacent localized electric fields and conventionally is referred to as a spatial light modulator 90.

Figure 4:
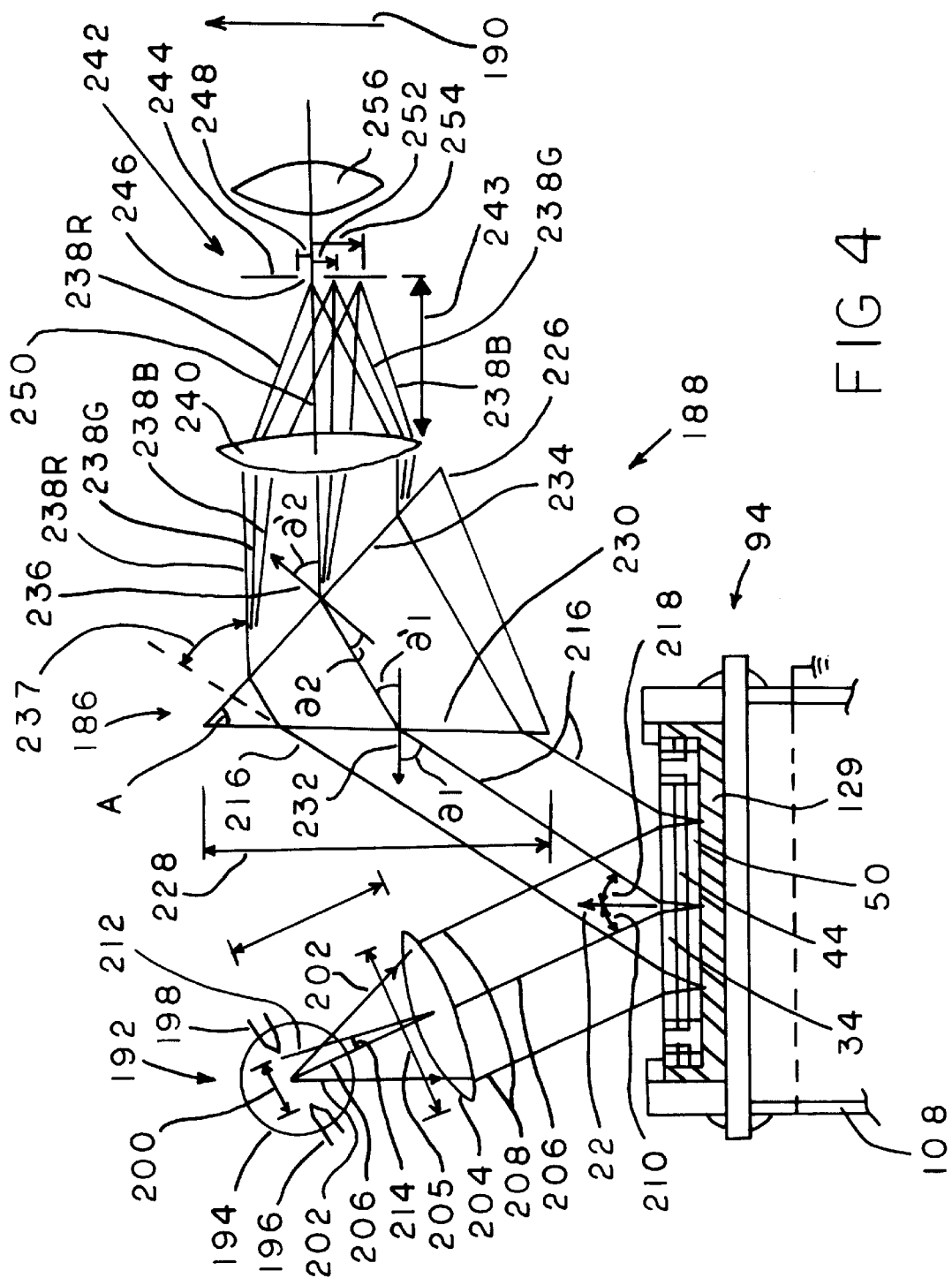
FIG. 4 shows a projection display system which is compatible with a cholesteric phase liquid crystal material utilized in a liquid crystal cell.

FIG. 4 shows a projection display system 186. System 186 further includes a cell 94. Cell 94 is affixed to tube 108 of an electron beam addressing mechanism. Electric fields can be applied to a uniformly thin flat layer of liquid crystal material 129 contained in cell 94 utilizing the electron beam addressing mechanism previously described. Accordingly, the electron beam addressing mechanism is not shown in detail.

System 186 further includes an optical subsystem 188 for forming an image 190 of a thin flat layer 129 of liquid crystal material contained in cell 94. Materials suitable for use as flat layer 129 include field sensitive cholesteric phase liquid crystals. Such materials are well understood by those knowledgeable in the state of the art. Layer 129 is a field sensitive cholesteric phase liquid crystal material.

Subsystem 188 further includes an arc lamp 192. Lamp 192 contains an envelope 194 surrounding a cathode 196 and an anode 198. Arc lamps are well understood by those knowledgeable in the state of the art, and accordingly, lamp 192 is not show in detail. Light emitted from lamp 192 emanates from a small area of diameter 200 located between cathode 196 and anode 198. Light emitted from lamp 192 is a continuous spectrum which spans the visible region of the electromagnetic spectrum. In addition the relative spectral amount light emitted from lamp 192 is of such a nature that a white light is produced. Such considerations are well understood by those knowledgeable in the state of the art. Filters could be included with lamp 192 to produce the desired white color characteristic. Lamp 192 is shown in a simplified manner to facilitate the discussion.

Light emitted from the center of diameter 200 are represented by rays 202. Rays 202 diverge from lamp 192 and are collected by a condensing lens 204 which has a clear aperture 205. Lens 204 is represented by a single element to facilitate purposes of discussion, but in general is a more complicated arrangement of elements to achieve the necessary correction of aberrations. Such considerations are well understood by those knowledgeable in the state of the art. Lens 204 has an optical axis 206 which intersects the center of diameter 200. Lens 204 transforms rays 202 into collimated rays 208 parallel to axis 206 which exit lens 204 in a direction toward cell 94. Rays 208 arrive at the second surface of faceplate 34 with an angle of incident 210 measured relative to axis 22.

An off axis ray 212 is shown in part to denote that diameter 200 establishes an angle 214 relative to axis 206 of lens 194. The amount of radiant flux gathered by lens 204 is dependent upon angle 214 of diameter 200. Such considerations are well understood by those knowledgeable in the state of the art.

Rays 208 traverse faceplate 34 and electrode 44 and layer 50, interact with flat layer 129 of cholesteric phase liquid crystal material and exit cell 94 as reflected rays 216. A ray which is collinear with axis 206 is incident on cell 94 and traverses cell 94 in a manner similar to that described for rays 208 and accordingly is also designated as a ray 216 after emerging from cell 94. A reflected wavefront emerging from cell 94, represented by rays 216, emerges from cell 94 with an angle of reflection 218 measured relative to axis 22.

Figure 5:
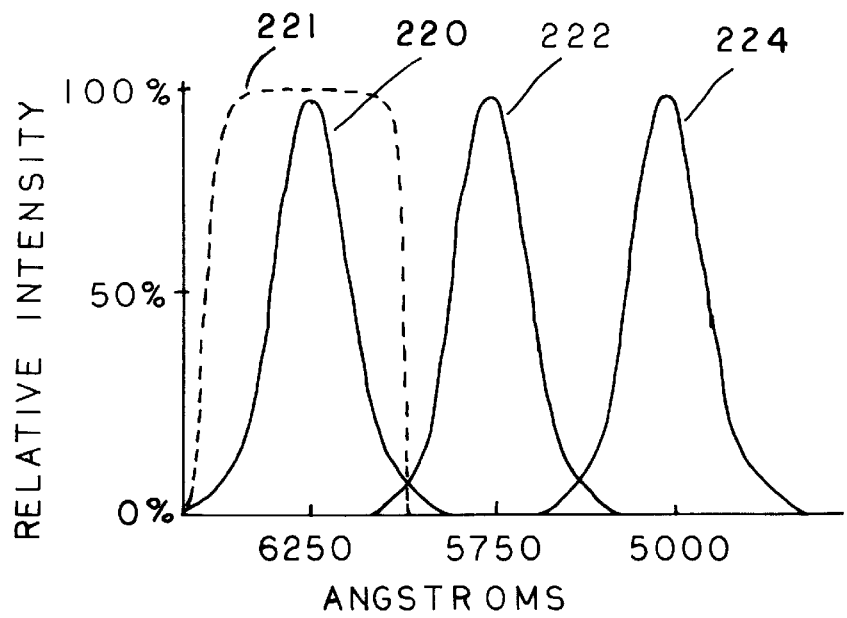
FIG. 5 shows the spectral response characteristics of components utilized in a projection display system.

As well understood by those knowledgeable in the state of the art, the spectral reflectance of cholesteric phase liquid crystal materials can be varied by an electric field applied to the material. See for instance information in U.S. Pat. No. 3,627,408. FIG. 5 shows the relative spectral response of light reflected from a uniformly thin flat layer of cholesteric phase liquid crystal material which is irradiated with white light as a function of an applied electric field. Assuming no electric field is applied to the material, light scattered from the liquid crystal layer gives rise to a red color to an observer as illustrated by curve 220. With an electric field applied to the material of the appropriate magnitude, the light scattered from the layer will be in the range as indicated by curve 222 so as to give off a green light. An application of a higher electric field, light scattered from the layer will give a blue color in the range indicated by curve 224. Such characteristics are well understood by those knowledgeable in the state of the art. Accordingly, the magnitudes of electric fields necessary to shift the spectral response in the manner indicated for particular compositions of cholesteric phase liquid crystal materials are readily determined and are not shown in the figure.

Returning to FIG. 4, rays 216 emitted from cell 94 are incident on a dispersive prism 226. The medium surrounding prism 226 is assumed to be air with an index of refraction of unity. Rays 216 span a clear aperture 228 of prism 226. Prism 226 is made from a material which has an index of refraction N (%). The notation N (%) is introduced to emphasize that the value of the index of refraction of the glass material utilized to fabricated the prism is wavelength dependent, and possess a dispersion characteristic defined to be dN/d % where the symbol % denotes wavelength.

Rays 216 are incident on a first surface 230 of prism 226 with an angle of incidence &1 relative to a normal 232 of surface 230. Rays 216 are refracted in accordance with Snell's law at surface 230 with an angle of refraction of &'1 relative to normal 232 and traverse prism 226 and strike a second surface 234 with an angle of incidence &2 relative to a surface normal 236 of surface 234. Surface 234 and surface 230 intersect forming a prism angle A. Rays 216 are refracted at surface 234. Rays which are refracted at surface 234 and emerge from prism 226 are designated by rays 238. Rays 238 make an angle of refraction of &'2 with normal 236. A deviation angle 237 relates the angular difference between the direction of rays 216 which are incident on prism 226 and the direction of corresponding rays 238 which emerge from the prism 226. Deviation angle 237 is dependent on &1, &'2 and A.

Prism 226 exhibits angular dispersion, i.e., different wavelengths of light are sent in different directions upon emerging from prism 226. The dispersion characteristics are described below.

$$d\ \&'2/d\% = \frac{\sin A}{\cos \&'1 \cos \&'2} \times \frac{dN}{d\%}$$

Accordingly, the direction of propagation, as represented by angle &'2, of a wavefront(s) which emerges from surface 234 of prism 226 depends on the spectral content of the wavefront. In my invention the spectral content of the wavefront is controlled by varying electric fields applied to flat layer 129. Rays 238 are subscripted with the letters R, G, B to emphasize this aspect of my invention. Varying the electric fields applied to layer 129 varies the direction of propagation of rays 238 since the spectral content of the wavefront reflected from layer 129, represented by rays 216, varies with the electric field applied to the layer 129. Subscripts R, G, B refer to the curves 220, 222 and 224 shown in FIG. 5 respectively.

Returning to FIG. 4, rays 238 emerging from prism 226 are collected by a second lens 240. A spatial filter 242 is separated from lens 240 by a focal length 243 of lens 240. Filter 242 comprises an opaque plate 244 containing a transparent hole 246 of a radius 248 entered on an optical axis 250 of lens 240. Axis 250 is parallel to rays 238R. As shown in the figure, rays 238G are focused by lens 240 on plate 244 at a radial offset 252 from axis 250. Rays 238B are focused by lens 240 on plate 244 at a radial offset 254 from axis 250. Rays 238R are focused on axis 250. By limiting radius 248 to a relatively small value, the spectral content of any wavefront passing through hole 246 can be controlled. By varying the spectrum of the wavefront reflected by layer 129 by varying the electric fields applied to cell 94, the location of the focus of rays 238 can be varied on plane 244 and accordingly the radiant flux passing through hole 246. A second lens 256 is utilized in conjunction with lens 240 to form image 190 of layer 129. Rays passing thru hole 246 and forming image 190 are not shown in the figure for convenience.

The amount of radiant flux passing thru hole 246 in turn influences the brightness and/or the chromaticity of image 190. Since the electric field applied to each pixel of cell 94 can be varied, the optical subsystem can be utilized to control the brightness and/or chromaticity of points in image 192 which correspond to each pixel in cell 94. The pixels and corresponding image points are not shown in the figure for convenience.

Although a prism was utilized in the optical subsystem to produce a spectrum of light reflected from the flat layer of cholesteric phase liquid crystal material in FIG. 4, utilizing the information contained herein, it will become evident to those knowledgeable in the state of the art that other dispersive elements may be utilized in my invention. Other dispersive elements which may be utilized in my invention include diffraction gratings, echelons, and/or introducing controlled amounts of lateral color aberration with lenses utilized to form an image of the layer of the liquid crystal material contained in the cell, i.e. orientating lenses which include a controlled amount of lateral color aberration relative to the direction of propagation of a wavefront reflected from a layer of cholesteric phase liquid crystal material to produce a variation in image height which is a function of wavelength. This enables the various images to be spatially filter to control the brightness of an image of the liquid crystal layer.

Figure 6:
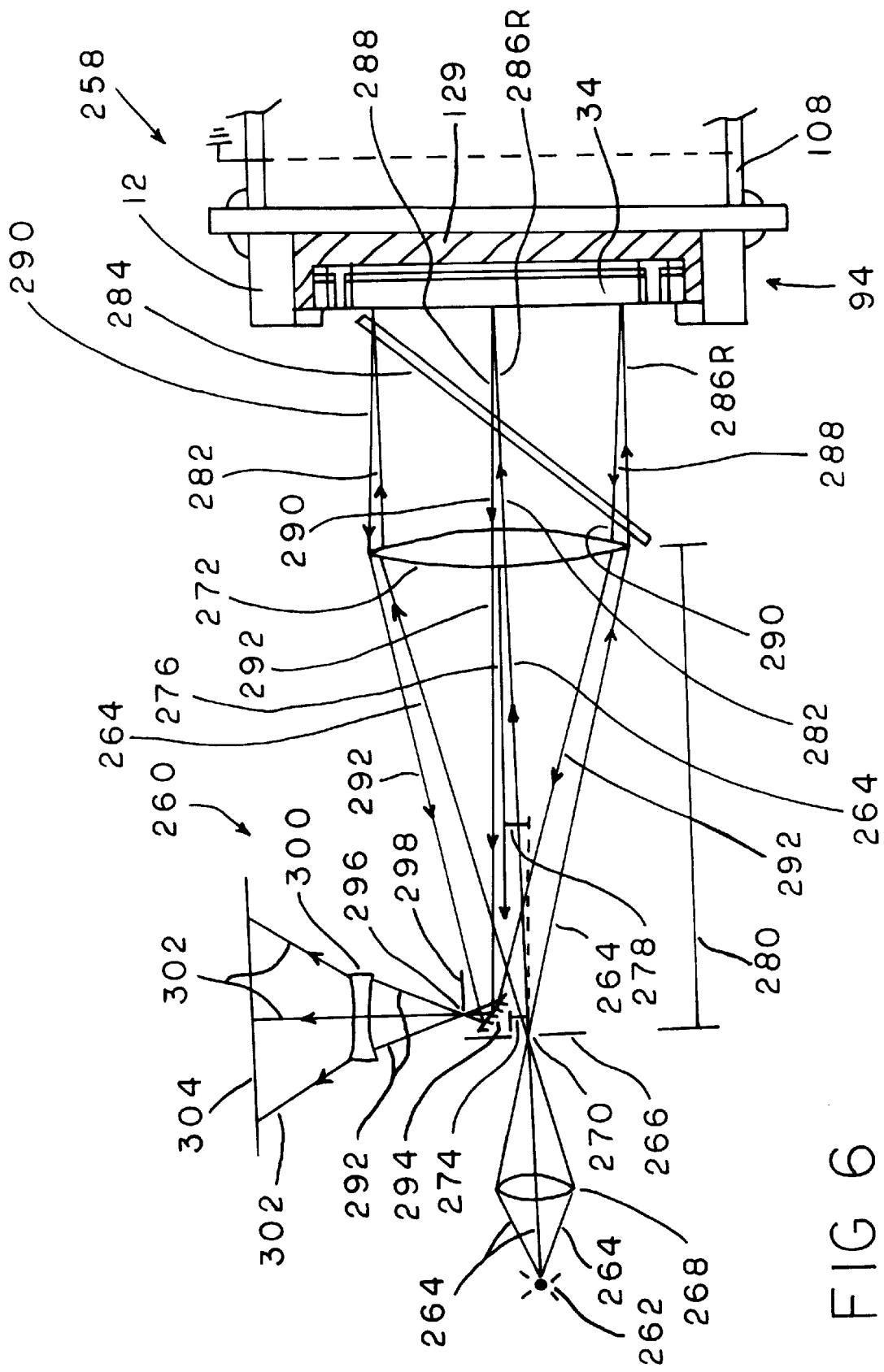
FIG. 6 shows a projection display system which is compatible with a cholesteric phase liquid crystal cell.

FIG. 6 shows a projection display system 258. System 258 further includes an optical subsystem 260 for producing an image of a flat layer 129 of cholesteric phase liquid crystal material contained in cell 94. Cell 94 is affixed to tube 108 of an electron beam addressing mechanism. Electric fields can be applied to uniformly thin flat layer 129 of liquid crystal material contained in cell 94 utilizing the electron beam addressing mechanism previously described. Accordingly, the electron beam addressing mechanism is not shown in detail.

Subsystem 260 further includes a small area white light source 262. Light rays 264 diverging from source 262 are focused onto an opening 270 of a spatial filter 266 by a relay lens 268. Rays 264 diverge from opening 270 and are collected by a collimating lens 272. Opening 270 further includes a radius 274. Lens 272 further includes an optical axis 276. The center of opening 270 is offset by a radial distance 278 from axis 276. In addition, opening 270 is separated from lens 272 by a focal length 280. Rays 264 collected by lens 272 are transformed into collimated rays 282 which are directed toward a dichroic mirror 284. Mirror 284 is an interference type of spectral filter and transmits rays 286R which lie in the red portion of the visible spectrum.

Returning to FIG. 5, a spectral transmission curve 221 of the dichroic mirror is superimposed over curve 220 to emphasize that the spectral region of transmission of the dichroic mirror is limited to transmitting the red portion of the visible spectrum. The dichroic mirror is not shown in the figure. The wavelengths transmitted by the dichroic mirror may be found by multiplying the spectrum of the light incident on the dichroic mirror and the dichroic mirror's spectral transmission curve 221. Such considerations are well understood by those knowledgeable in the state of the art.

Returning to FIG. 6, rays 286R are incident on faceplate 34 of cell 94. Axis 276 is collinear with the axis of revolution of cylinder 12. The axis of revolution of cylinder 12 is not shown in the figure. Rays 286R traverse faceplate 34 and interact with layer 129 and are scattered by the cholesteric phase type liquid crystal material which is utilized for layer 129. Rays traversing cell 94 are not shown in the figure for convenience. A reflected wavefront indicated by rays 288 emerge from cell 94 and are incident on mirror 284.

A transmitted wavefront represented by rays 290, emerges from mirror 284 with a radiant flux which is dependent on the spectral content of the wavefront represented by rays 288 and the spectral transmission of mirror 284. As previously identified, the spectral content of the wavefront reflected by a layer of cholesteric phase liquid crystal material may be varied by an electric field applied to the material. Transmitted rays 290 emerging from mirror 284 are collected by lens 272. Rays 290 collected by lens 272 are transformed into converging rays 292 which converge toward a fold mirror 294. Mirror 294 reflects rays 292 to enable rays 292 to converge to a focus forming an image 296 of opening 270. A knife edge 298 is located near image 296 to block stray radiation. Rays 292 diverge from image 296 and are collected by lens 300. Lens 300 transforms rays 292 to rays 302 which form an image of layer 129 on a viewing screen 304. The image formed on screen 304 is not shown in the figure for convenience.

As can be readily seen from FIG. 5, shifting the spectral content of a wavefront reflected from a flat layer of cholesteric phase liquid crystal material by varying the electric field applied to the layer, the amount of radiant flux transmitted by the dichroic mirror will vary. Since the wavefront reflected from the layer and transmitted by the mirror is utilized to form the image of the layer, the amount of radiant flux utilized to form the image of the layer may be varied by varying the electric field applied to the layer. This in turn varies the brightness and/or chromaticity of the image of the layer of liquid crystal material.

Since this relationship occurs for each pixel in a cell, the brightness and/or chromaticity of each image point corresponding to a respective pixel in the cell may be controlled by varying the electric field applied to the pixel.

Returning to FIG. 6, use of mirror 284 in the projection system 258 eliminates the need for a dispersive optical element, such as a prism, for varying the brightness and/or chromaticity of the image. However, system 258 may be modified by introducing a controlled amount of lateral color into lens 272. Utilizing the information contained herein, those knowledgeable in the state of the art will be able to identify the amounts of lateral color necessary to introduce into lens 272 to achieve a desired control over the brightness and/or chromaticity of an image of layer 129 in response to an electric field applied to layer 129.

Modifications may be made to the projection systems identified herein to accommodate additional liquid crystal cells which operate over specific spectral ranges. This may be accomplished by utilizing wavefronts which are reflected from dichroic mirrors. Use of multiple cells in a projection display system is a technique utilized in projection display systems to increase the gaumet of reproducible colors. For instance, dichroic mirrors may be arranged in the manner illustrated in FIG. 10 of the article titled "Viscoelastic Spatial Light Modulators and Schlieren-Optical Systems for HDTV Projection Displays", by R. Gerbard-Multhaupt et al, SPIE Vol. 1255 Large Screen Projection Displays II (1990) to control the gaumet of reproducible colors. Alternatively, a single cell may operate in a field sequential mode to generate a large gaumet of reproducible colors. Dispersive elements and spectral filters may be combined to control the brightness and/or chromaticity of an image of a thin flat layer of cholesteric phase liquid crystal material. Both types of filteres, i.e. spectral and spatial, may be combined to implement a multiple cell configuration which employs a dispersive optical elements to control the brightness and/or chromaticity of an image formed of each cell. Utilizing the information contained herein, such considerations will become obvious to those knowledgeable in the state of the art.

Figure 7:
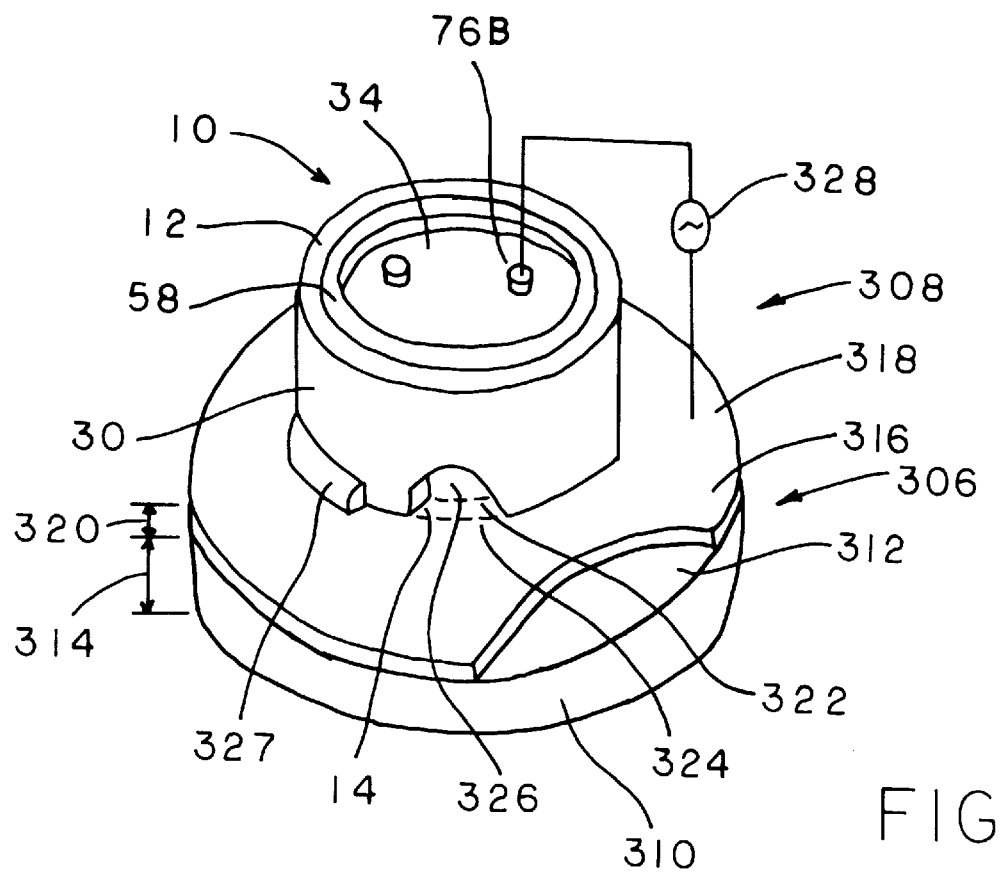
FIG. 7 shows a liquid crystal cell formed from a composite arrangement of substrates.

FIG. 7 shows an assembly 10 affixed to a backplane assembly 306 to form a liquid crystal cell 308. Assembly 10 further includes faceplate 34 affixed to cylinder 12 with fillet 58. Assembly 306 further includes a substrate 310. Substrate 310 further includes a first surface essentially parallel to and separated from a second surface 312 by a thickness 314. Substrate 310 is optically transparent. The first surface is not visible in the figure. Surface 312 is processed to be optically flat. Affixed to surface 312 is an optically transparent electrically conductive electrode 316. Electrode 316 further includes a first surface essentially parallel to and separated from a second surface 318 by an electrode thickness 320. The first surface of electrode 316 is in contact with surface 312. The first surface of electrode 316 is not visible in the figure.

Portions of cylinder 12 have been shown cutaway for clarity. Surface 14 of cylinder 12 is in contact with surface 318 of electrode 316. A first dotted curve 322 identifies a portion of the intercept between surface 318 and the inside surface of cylinder 12. The inside surface of cylinder 12 is not visible in the figure. A second dotted line 324 identifies a portion of the intercept of surface 30 with surface 318. A cavity 326 is formed by the volume of space existing between electrode 318 and the first surface of faceplate 34 and bound by the inside surface of cylinder 12.

A solder glass fillet 327 formed around surface 30 is in contact with surface 318 is utilized to affix cylinder 12 to electrode 316, thereby affixing assembly 10 to assembly 306.

A voltage source 328 applies a potential difference between plug 768 and electrode 316. Plug 768 is electrically connected to the electrode which covers the first surface of faceplate 34 by a feedthrough. The first surface of faceplate 34 and the electrode deposited on the first surface of faceplate 34 in addition to the feedthrough are not visible in the figure. Applying a potential difference between plug 768 and electrode 318 applies an electric field to a flat layer of liquid crystal material contained in cavity 326. The liquid crystal material is not shown in the figure for convenience. Varying the electric field applied to cell 308 varies a property of a wavefront which traverses cell 308. The wavefront is not shown in the figure.

As can seen in the FIG. 7, electrode 316 overlaps faceplate 34 and intervenes between surface 14 and surface 312 of substrate 310. Cells which were previously described and configured for use with electron beam addressing placed the second surface of the substrate utilized in the backplane assembly in contact with surface 14. Such a condition precludes the use of discrete spacer technology. Although electrode 316 intervenes between surface 14 and surface 312 of substrate 310 of backplane assembly 306, electrode 316 also covers the opening in surface 14 and overlaps faceplate 34. This enables electrode 316 to apply an electric field to a flat layer of liquid crystal material contained in cavity 326. Such functionality is essential for cell operation. In addition, electrode 316 is not a hollow element. Accordingly, electrode 316 distinguishes over a gasket since a gasket is a hollow element and is limited to the periphery of the cell.

Cell gaps typically range from approximately 2 to 10 microns for use in display applications. Although as indicated in the references cited herein, smaller or larger gaps may be utilized. However, typical gap dimensions are significantly larger than the thickness typically associated with electrodes and/or alignment layers. As identified in the article titled "Thin Film Surface Orientation for Liquid Crystals" by John L. Janning, Applied Physics Lett. Vol. 21, No. 4, Aug. 15, 1972, alignment layer thickness may be on the order of 70 angstroms. As identified in U.S. Pat. No. 4,115,544, the thickness of electrodes may be on the order of 400 angstroms. Such differences further distinguish electrodes and alignment layers from a gasket. This is attributed to the fact that an intervening layer which is an electrode and/or an alignment layer will not possess sufficient thickness to function as a spacer and/or gasket.

Although FIG. 7 shows electrode 318 intervening between surface 14 and surface 312, other components may intervene between these surfaces and overlap the faceplate to support operation of the cell thereby distinguishing over a gasket. Although an alignment layer was not shown covering electrode 318, use of an alignment layer would require the alignment layer to overlap faceplate 34. If such an alignment layer is extended in lateral extent to intervene between surface 14 and surface 312, the alignment layer would not be limited to the periphery of cell and accordingly distinguishes over a gasket. Electrode 318 can be rubbed with a diamond cloth in a manner well understood by those knowledgeable in the state of the art to produce alignment of liquid crystal materials in cavity 326. Accordingly, an alignment layer is not shown in this figure.

Utilizing the information contained herein, it will become obvious to those knowledgeable in the state of the art that other types of layers may intervene between the faceplate assembly and the backplane assembly and overlap the cavity to facilitate operation of the cell thereby distinguishing over a gasket. Such layers could include optical components such as reflectors including multilayer dielectric mirrors, polarizing elements, spectral filters, etc, alignment layers as previously identified and various types of electrodes such as the monolithic electrode 318 identified in FIG. 7, photoconductive materials and other light sensitive elements such as diodes, and as to be shown herein, a plurality of column electrodes such as would be utilized with matrix arrays, active or passive implementations.

Figure 8:
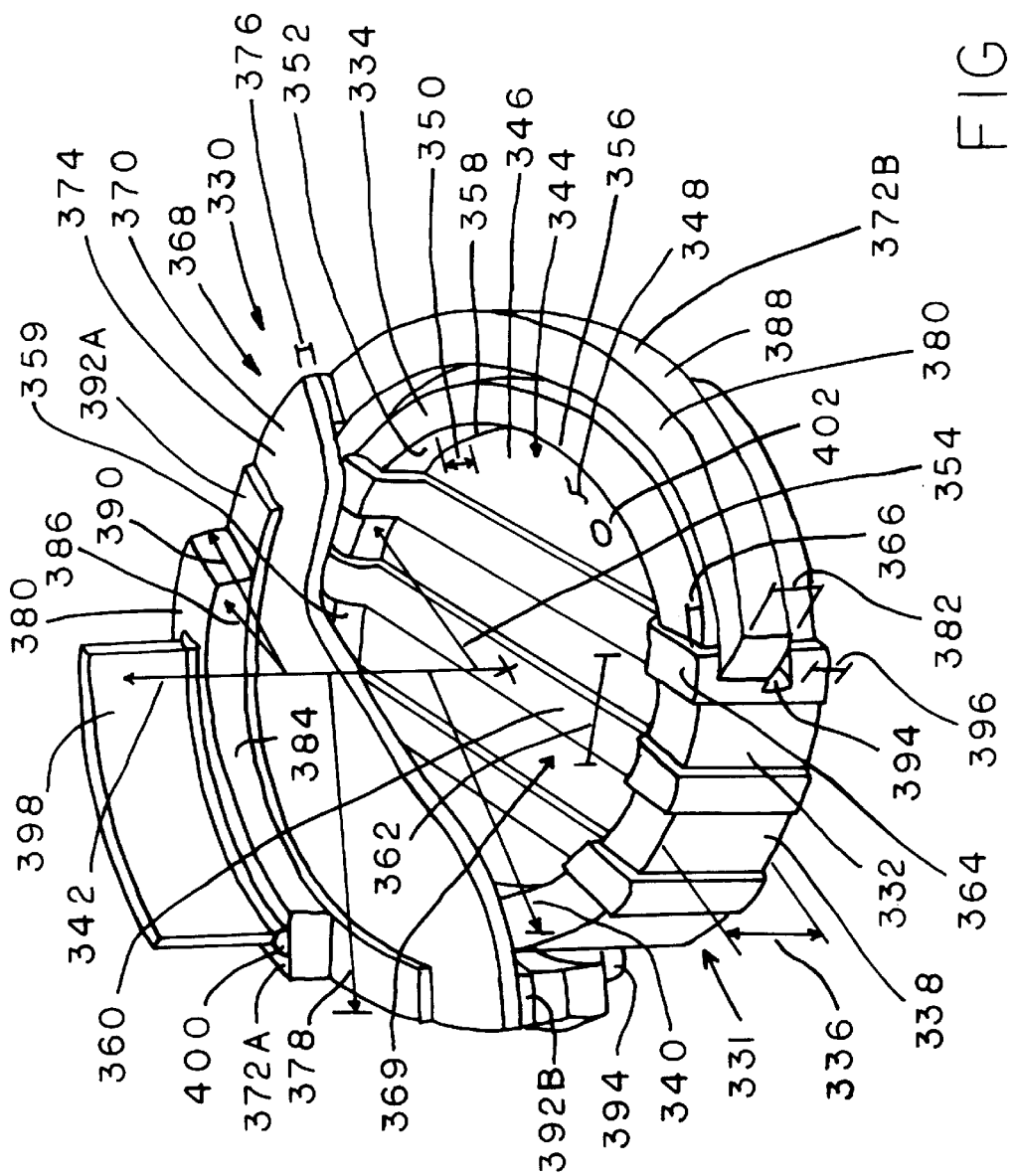
FIG. 8 shows a liquid crystal cell containing a hollow region formed in a monolithic substrate.

FIG. 8 shows a liquid crystal cell 330. Cell 330 comprises a faceplate assembly 331. Assembly 331 comprises a monolithic, solid cylindrical shaped substrate 332. Substrate 332 is optically transparent and electrically insulating. Materials suitable for use with substrate includes glass. Substrate 332 comprises a first surface 334 essentially parallel to and offset from a second surface by a substrate thickness 336. The second surface of substrate 332 is not visible in the figure. Substrate 332 further includes exterior side surface 338 separated from an axis of revolution 342 of substrate 332 by an outside radius 340. Surface 334 is formed on substrate 332 to be a plane. Techniques for forming surfaces to be a plane include conventional optical polishing techniques utilized for fabricating optical flats.

Substrate 332 comprises a cavity 344 formed in substrate 332. Cavity 344 comprises a reference surface 346 embedded in and recessed from an opening 348 formed in surface 334 by cavity 344. Opening 348 lies in the plane of surface 334. Surface 346 is offset from opening 348 by a cell gap 350. Surface 346 is a plane parallel to surface 334. Gap 350 is perpendicular to surface 346. Cavity 344 may be formed by any number of methods including selective etching of substrate 332. See for instance information in the article titled "Polish", Scientific Papers, by John William Strutt, Baron Rayleigh, Vol. 4, 1892 to 1901. Additional fabrication techniques include mechanical polishing utilizing sub diameter optical polishing tools. Additional techniques are further described in application Ser. No. 08/699,511.

Recessing surface 346 from opening 348 creates an inside side surface 352. Surface 352 is shown as a cylindrical surface. Surface 352 is separated from axis 342 by an inside radius 354. Radius 354 is perpendicular to gap 350. Surface 352 extends between surface 334 and surface 346. Surface 352 intersects surface 334 forming a perimeter 356 which bounds opening 348. In a similar manner surface 352 intersect surface 346 forming a second perimeter 358 which bounds the lateral extent of surface 346 to radius 354. Accordingly, surface 352 circumscribes surface 346. Surface 352 surrounds cavity 344. The portion of substrate 322 which lies between surface 352 and surface 338 and protrudes above surface 346 is a flange 359 which serves as a side wall to surround cavity 344. Flange 359 is a hollow element formed on substrate 332 which bounds surface 346. Flange 359 is a hollow element formed on substrate which circumscribes surface 346.

Cell 330 further includes a plurality of optically transparent electrically conductive column conductors 360. Adjacent conductors 360 are displaced by a period 362. Each conductor 360 further includes a first surface 364 essentially parallel and separated from a second surface of the conductor 360 by a conductor thickness 366. The second surfaces of conductors 360 are not visible in the figure. The second surface of each conductor 360 is in contact with surface 346. Each conductor 360 is affixed to surface 346. In addition, each conductor 360 is routed over substrate 332 so the second surface of each conductor 360 is in contact with surface 352 and surface 334 and surface 338. Each conductor 360 is folded over and spans surface 338 to facilitate electrical connections to conductors 360. This routing technique enables an electrical contact to be established between each conductor 360 and a respective amplifier. The amplifiers are not shown in the figure for convenience.

Cell 330 further includes a backplane assembly 368. Assembly 368 further includes a second substrate 370 mounted between a first ring 372A and a second ring 372B. Substrate 370 further includes a first surface 374 essentially parallel to and separated from a second surface by a substrate thickness 376. The second surface of substrate 370 is not visible in the figure. Substrate 370 is in the form of a disk and extends a radius 378 from axis 342. Radius 378 is chosen to be larger than radius 340 enabling substrate 370 to cover opening 348 and surface 334.

The second surface of substrate 370 is in contact with the portion of surface 364 of each conductor 360 which overlaps surface 334. The second surface of substrate 370 is not visible in the figure.

Ring 372A and ring 372B further includes a first surface 380 essentially parallel to and separated from a second surface of ring 372 by a ring thickness 382. Ring 372A and ring 372B further include an inside surface 384 separated from axis 342 by an inside radius 386. Ring 372A and ring 372B further include an outside surface 388 separated from axis 342 by an outside radius 390.

A first glass solder washer 392A is utilized to affix surface 374 to the second surface of ring 372A. A second solder glass washer 392B is utilized to affix the second surface of substrate 370 to surface 380 of ring 372B. Materials suitable for use as rings include soda lime glass, and metal alloys identified in the references cited herein. Materials suitable for use as substrate 370 include mica, glass, etc.

A solder glass seal 394 is utilized to affix ring 372B to surface 338. Thickness 382 of ring 372B is selected relative to thickness 336 to expose a tab portion 396 of each conductor 360 to facilitate electrical connections. Seal 394 is formed around surface 338 and is in contact with ring 372B to enable a vacuum seal to exist between cell 330 and a vacuum tube 398 affixed to surface 380 of ring 372A ring by an indium seal 400.

Affixing assembly 368 to substrate 332 enables a liquid crystal material to be contained in cavity 344. Cavity 344 may be filled with a liquid crystal material disposed into cavity 344 thru a fill hole 402 in substrate 332. Fill hole 402 extends from surface 346 to the second surface of substrate 332. A malleable metal plug may be utilized to seal hole 402 after a liquid crystal material is introduced into cavity 344. Use of such techniques to seal cavity 344 has been previously described and accordingly malleable metal plugs are not shown in the figure for convenience. Electro-optic materials suitable for use in the cavity 344 include cholesteric phase liquid crystal materials, and/or nematic and/or sematic phase liquid crystal materials.

The order of fabrication of cell 330 is selected so assembly 368 is fabricated prior to affixing assembly 368 to substrate 332. After assembly 368 is fabricated, ring 372B is slipped over substrate 332 until the second surface of substrate 370 contacts surface 364 of conductors 360. Seal 394 is then utilized to affix assembly 368 to substrate 332. By fabricating cell 330 in this manner, discrete spacers are precluded from intervening between substrate 370 and substrate 332. An electron beam source array may be utilized with amplifiers electrically connected to each conductor 360 to apply electric fields to pixels formed between each conductor 360 and the corresponding elemental areas overlapped by the conductor and bombarded with electrons emitted by a respective electron source. See for instance information in U.S. Pat. No. 5,557,177, to Craig D. Engle, Sep. 17, 1996 titled "Enhanced Electron Beam Addressed Storage Target". The amplifiers and the electron source array are not shown in the figure for convenience.

Applicant notes that surface 346 is bound and/or circumscribed by surface 352 enabling surface 346 to be offset from opening 348 to any desired value. Column conductors 360 intervene between assembly 331 and assembly 368, but also overlap surface 346 thereby distinguishing over the prior art which utilizes gaskets including U.S. Pat. No. 4,443,063.

Figure 9:
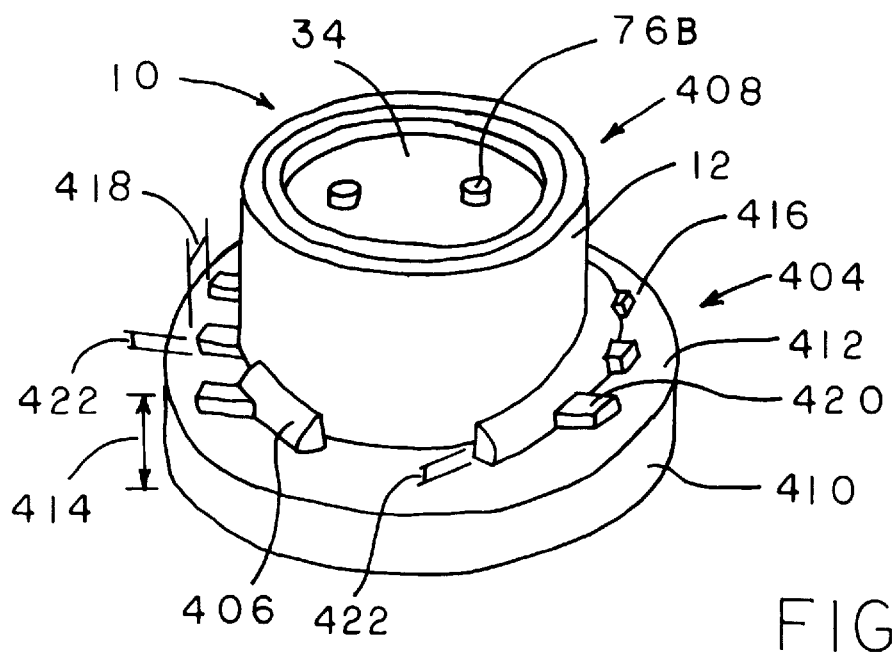
FIG. 9 shows a liquid crystal cell formed from a composite arrangement of substrates.

FIG. 9 shows a faceplate assembly 10 affixed to a backplane assembly 404 by a solder glass fillet 406 to form a liquid crystal cell 408. Assembly 404 further includes a substrate 410. Substrate 410 further includes a first surface essentially parallel to and separated from a second surface 412 by a substrate thickness 414. A plurality of column conductors 416 are affixed to surface 412. Adjacent conductors 416 are separated by a period 418. Each conductor 416 further includes a first surface essentially parallel to and separated from a second surface 420 by a conductor thickness 422. The first surface of each conductor 416 is in contact with surface 412. The first surface of each conductor 416 is not visible in the figure. Assembly 10 is positioned relative to assembly 404 so that faceplate 34 overlaps each conductor 416. In addition, the first end surface of cylinder 12 is in contact with surface 420 of each conductor 416. This offsets the first end surface of cylinder 12 from surface 412 by thickness 422. The first end surface of cylinder 12 is not visible in the figure. Each conductor 416 is electrically connected to a respective amplifier enabling a potential difference to be established between each conductor 416 and the electrode affixed to the first surface of faceplate 34. The first surface of faceplate 34 and the electrode affixed to the first surface of faceplate 34 in addition to the feedthroughs are not visible in the figure.

Applying a respective potential difference between any of the column conductors and plug 768 simultaneously activates a row of pixels in cell 408. Such devices have several applications. See for instance information in U.S. Pat. No. 5,557,177.

Figure 10:
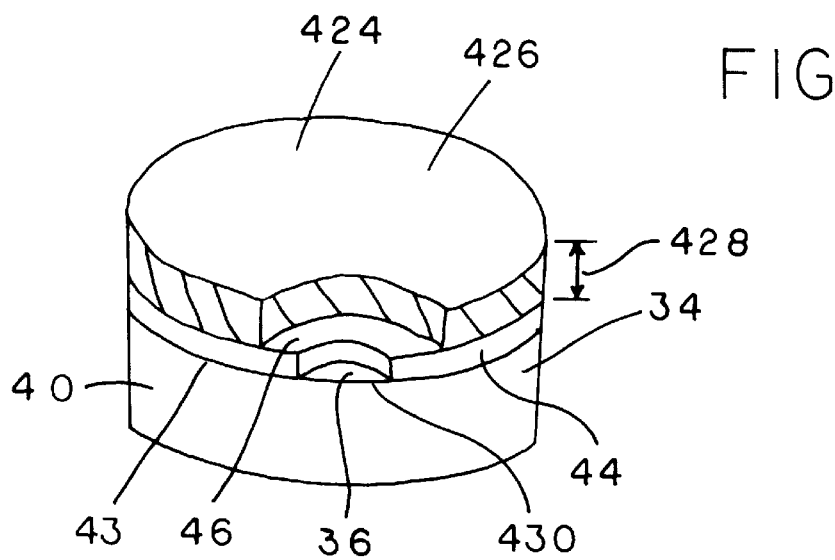
FIG. 10 shows a liquid crystal cell in an intermediate state of assembly.
Figure 11:
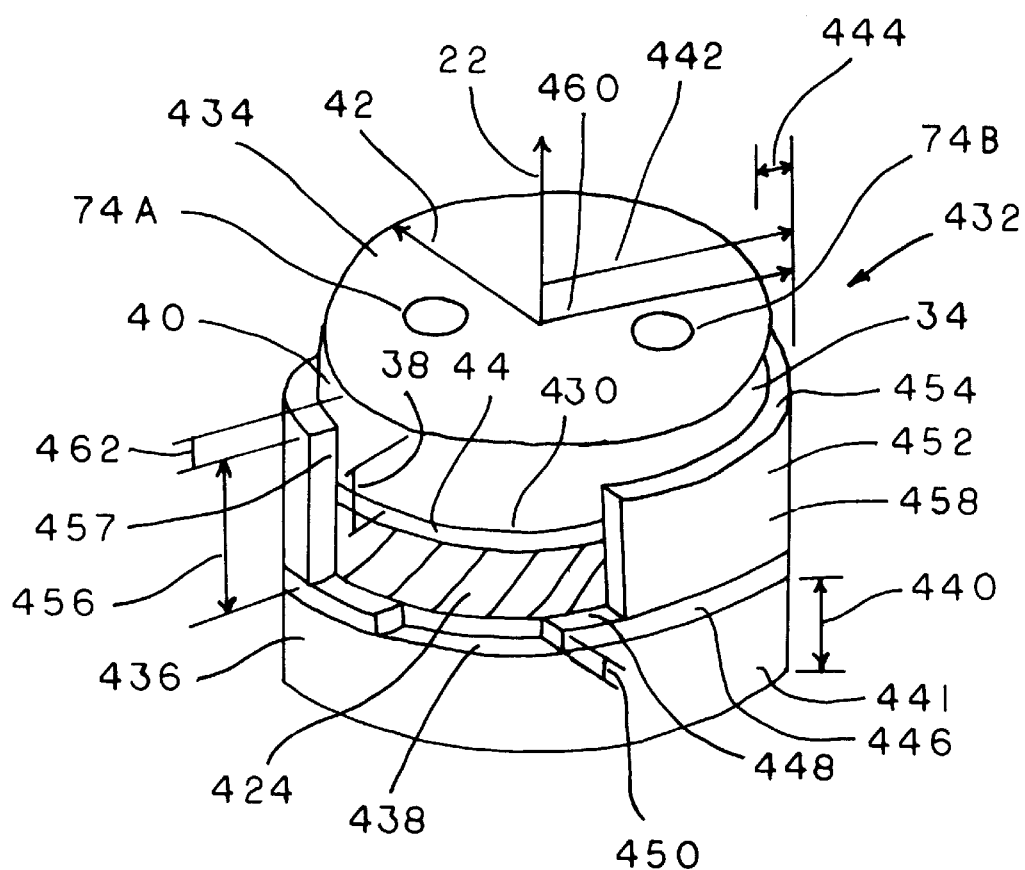
FIG. 11 shows a liquid crystal cell which utilizes a ring to surround a cavity existing between opposing surfaces to seal a liquid crystal material in the cavity.

FIG. 10 and FIG. 11 describe still yet another technique for fabricating a liquid crystal cell. FIG. 10 shows a faceplate 34. Faceplate 34 further includes electrode 44 affixed to surface 36. Affixed to surface 46 of electrode 44 is a layer 424 of metal salt. Suitable metal salts for use in my invention includes barium chloride. Utilizing the information contained herein, those knowledgeable in the state of the art will be able to identify additional metal salts suitable for use with my invention. See for instance information in U.S. Pat. No. 3,295,028 to G. R. Argue et al, Dec. 27, 1966.

Layer 424 further includes a first surface 426 essentially parallel to and separated from a second surface of layer 424 by a layer thickness 428. The second surface of layer 424 is not visible in the figure. The second surface of layer 424 is in contact with surface 46. As identified in the references cited herein, techniques for affixing layer 424 to electrode 44 includes vacuum evaporation. As to be identified herein, thickness 428 influences the cell gap of a liquid crystal cell fabricated using faceplate 34. Typical values for thickness 428 range from approximately two to ten microns. Surface 40 of faceplate 34 intercepts surface 36 forming a perimeter 43.

FIG. 11 shows a liquid crystal cell 432. Cell 432 further includes faceplate 34. Faceplate 34 further includes a second surface 434 essentially parallel to and separated from the first surface of faceplate 34 by thickness 38. The first surface of faceplate 34 is not visible in the figure. The first surface of electrode 44 is rubbed utilizing conventional techniques prior to affixing layer 424 to electrode 44 to facilitate alignment of liquid crystal materials. Accordingly, an alignment layer is not shown in this figure. The first surface of electrode 44 is not shown in the figure. Surface 40 of faceplate 34 is separated from axis of revolution 22 by radius 42.

Cell 432 further includes a second substrate 436. Substrate 436 further includes a first surface essentially parallel to and separated from a second surface 43 by a thickness 440. Certain portions of my invention have been cut away for convenience. The first surface of substrate 436 is not visible in the figure. Substrate 436 further includes an axis of revolution. The axis of revolution of substrate 436 is collinear with axis 22 and accordingly is not explicitly shown in the figure. Substrate 436 further includes a side surface 441 separated from axis 22 by an outside radius 442. Radius 442 is larger than radius 42 creating an overhang 444.

Affixed to surface 438 is an electrode 446. Electrode 446 further includes a first surface essentially parallel to and separated from a second surface 448 by an electrode thickness 450. The first surface of electrode 446 is in contact with surface 438. The first surface of electrode 446 is not visible in the figure. Faceplate 34 is located relative to substrate 436 so layer 424 is in contact with surface 448.

Cell 432 further includes a solder glass ring 452. Ring 452 further includes a first surface essentially parallel to and separated from a second surface 454 by a ring thickness 456. The first surface of ring 452 is in contact with the portion of surface 448 of electrode 446 which coincides with overhang 444. The first surface of ring 452 is not visible in the figure.

Ring 452 further includes an inside side surface 457 in contact with surface 40 of faceplate 34. Ring 452 further includes an outside surface 458 separated from axis 22 by an outside radius 460. Radius 460 is equal to radius 442. Surface 457 wraps around surface 40 of faceplate 34 surrounding perimeter 43 thereby circumscribing perimeter 43. Portions of ring 452 have been shown cutaway for clarity. Surface 434 of faceplate 34 is separated from surface 454 of ring 452 by an extension distance 462. Utilizing the information contained herein, cell 432 can be processed utilizing techniques which will become obvious to those knowledgeable in the state of the art to enable ring 452 to form a vacuum seal between faceplate 34 and substrate 436. Information concerning the temperature cycle permissible in processing the solder glass ring in order for the ring to form the vacuum seal is provided in the references cited herein.

After solder glass rings 452 are processed to seal faceplate 34 to substrate 436, an electrolytic solution may be introduced into channels 74A and 74B to dissolve layer 424. After dissolving layer 424, a cavity will exist in the volume of space between electrode 44 and electrode 446 and surrounded by ring 452 which can be filled with a liquid crystal material thru channels 74. The cavity is not shown in the figure. Malleable metal plugs are utilized to seal the cavity thereby containing a liquid crystal material in the cavity. The malleable metal plugs are not shown in the figure for convenience. The cavity and liquid crystal materials, and the feedthrough linings in the channels are not shown in the figure for convenience. Ring 452 permits cell 432 to be sealed with a single hollow element extending between faceplate 34 and substrate 436.

Figure 12:
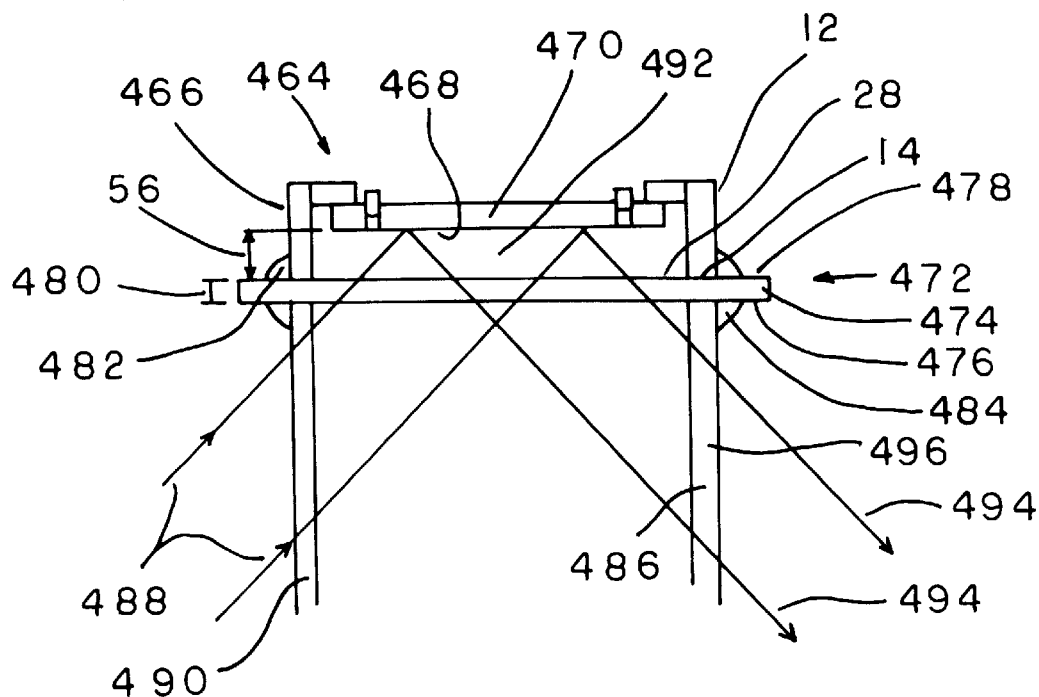
FIG. 12 shows a liquid crystal cell utilizing a surface recessed in a substrate and offset from an opening in the substrate to eliminate the need for a discrete spacer technology.

FIG. 12 shows yet another liquid crystal cell 464. Cell 464 further includes a faceplate assembly 466 comprising hollow cylinder 12. Cell 464 further includes a first surface 468 of a substrate 470 recessed in cylinder 12 and separated from opening 28 in surface 14 of cylinder 12 by a cell gap 56. Surface 468 is parallel to surface 14. 470 substrate is electrically conductive. Materials suitable for use with substrate includes metals. Cell 464 further includes a backplane assembly 472 comprising a second substrate 474. Substrate 474 further includes first surface 476 essentially parallel to and separated from a second surface 478 by a substrate thickness 480. Surface 478 is in contact with surface 14. A solder glass fillet 482 is utilized to seal substrate 474 to cylinder 12. Substrate 474 is optically transparent and electrically insulating. Material suitable for substrate include glass.

A fillet 484 is utilized to seal substrate 474 to a vacuum envelope 486 of an electron beam addressing mechanism. Electron beam addressing mechanisms have been previously described and only envelope 486 is shown in the figure for clarity. A collimated wavefront represented by rays 488 traverses a first side surface 490 of envelope 486 and are incident on surface 476. Rays 488 traverse substrate 474 interact with a layer of liquid crystal material contained in a cavity 492 surrounded by cylinder 12. The layer of liquid crystal material is not shown in the figure for clarity. A wavefront represented by rays 494 emerge from cell 464 and traverse a second side surface 496 of envelope 486 to form an image of the liquid crystal material contained in cavity 492. The image and the optical system necessary to form an image of the layer of liquid crystal is not shown in the figure for convenience.

Geometries suitable for vacuum envelopes to accommodate a wavefront traversing the envelope are well understood by those knowledgeable in the state of the art and accordingly envelope is not shown in detail. In addition, wavefront rays are not shown refracted an any refractive index boundary for convenience. See for instance information in U.S. Pat. No. 2,681,423 to M. Auphan, Jun. 15, 1954. Applicant notes that if element 30 in patent 2,681,423 is made dispersive, i.e. introducing the appropriate amount of edge into the faceplate, then the optical system illustrated in U.S. Pat. No. 2,681,423 can be utilized to form images of a layer of liquid crystal materials.

Figure 13:
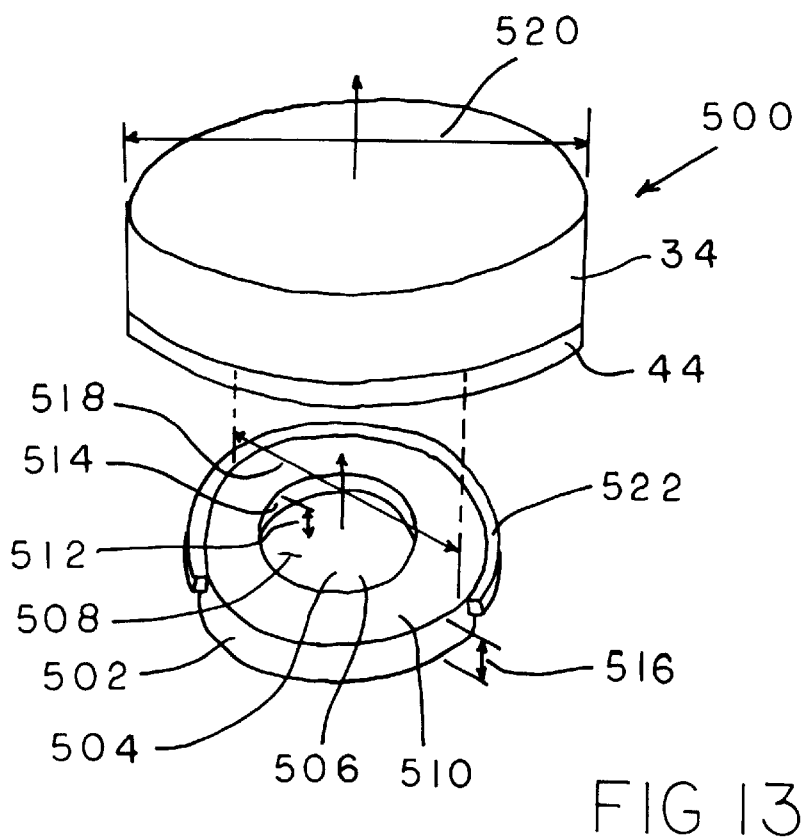
FIG. 13 shows a liquid crystal cell utilizing a surface recessed in a substrate and offset from an opening in the substrate to eliminate the need for a discrete spacer technology.

FIG. 13 shows still another liquid crystal cell 500. Cell 500 further includes faceplate 34. Electrode 44 is affixed to the first surface of faceplate 34. The first surface of faceplate 34 is not visible in the figure. Cell 500 further includes a substrate 502. Substrate 502 contains a cavity 504. Cavity 504 is formed in substrate 502 by recessing a reference surface 506 from an opening 508 formed by cavity 504 in a exterior surface 510 of substrate 502. Surface 506 is offset from surface 510 by a cell gap 512. Recessing surface 506 in substrate 502 forms a side surface 514 which surrounds cavity 504. Substrate 502 further includes a second surface offset from surface 510 by a thickness 516. The second surface is not visible in the figure.

Substrate 502 further includes a diameter 518 which is selected to be less than a diameter 520 of faceplate 34 to create an overhang which may be utilized to seal faceplate 34 to a vacuum tube. The overhang and vacuum envelope are not shown in the figure for convenience.

Surface 510 is in contact with the first surface of electrode 44. The figure is shown in an exploded view for convenience. Substrate 502 is affixed to electrode 44 by a solder glass fillet 522.

An electric field may be applied to a liquid crystal material contained in cavity 504 by bombarding the first surface of substrate 502 with electrons. Such considerations have been previously discussed, and accordingly are not shown in the figure for convenience.

Liquid crystal material can be "painted" on surface 506 and/or deposited in cavity 504 prior to affixing substrate 502 to faceplate 34. This avoids any requirements for the use of fill channels to assist in filling cavity 504 with an electro-optic material. Techniques for forming substrate 502 include sputtering glass and/or vacuum depositing polystyrene over a substrate which contains a protruding layer. Such a technique would enable the protruding layer to form the cavity. The substrate may or may not be sacrificial depending upon the properties of the layer. For instance, I believe that a layer of liquid crystal may be deposited on an electrode utilizing the techniques identified by U.S. Pat. No. 3,409,404 and that the layer of liquid crystal and exposed portions of the overlapping electrode may be coated with a suitable material such as glass, to hermetically seal the layer of liquid crystal within a cell cavity which exhibits the geometry identified herein. A layer of liquid crystal material which is formed on a first substrate and which exhibits suitable geometry to form a cavity as described herein in a material which is applied to all sides of the layer not in contact with the first substrate, such as by the use of sputtering, vacuum evaporation or any other process, is a means for forming the cavity.

CONCLUSION, RAMIFICATIONS, AND SCOPE OF INVENTION

While my above description contains many specificities, these should not be construed as limitations on the scope of the invention, but rather as an exemplification of one preferred embodiment thereof. Many other variations are possible. For example, although liquid crystal materials were identified as the electro-optic material for use as the thin, flat layer of electro-optic material in the cell of my invention, other electro-optic material may be utilized. Such materials include kerr effect materials including but not limited to nitrobenzene. In addition, utilizing the information contained herein, it will become obvious to those knowledgeable in the state of the art that the cell may also be utilized as an electrochromic display cell, an electrophoretic display cell, etc.

Conductors affixed to the faceplate may be orientated to cross over conductors affixed to the substrate in the backplane assembly to produce a matrix array. Transistors may be added, including thin film transistors to implement active matrix addressing schemes with the cell configurations of my invention. The faceplate and/or the substrate utilized in the backplate assembly may contain electrical feedthroughs to implement wire mosaics. Wire mosaic are well understood by those knowledgeable in the state of the art.

Although cell geometries have been described with hollow elements which possess circular cross sections, described as hollow cylinders or cylindrical surfaces having a fixed separation from an axis of revolution, more general geometric shapes may be utilized with the hollow element and/or substrates, of my invention, including the faceplate. Such shapes may include rectangular and square cross sectional profiles.

However, it must be noted that the use of a cylindrical surface to surround the cavity represent the minimum number of side surfaces which can be utilized to surround the cavity. If a rectangular cross sectional profile is utilized, then at least three additional surfaces will be required. These surface will intersect and form intercepts which are present in the boundary which sourrounds the cavity. In addition, all side surfaces which comprise a rectangular cross sectional profile which surround the cavity of the cell will exhibit variations in separation form a center line of the cell. Techniques for defining a center line of a cell could involve utilizing the optical axis of an optical projection system as the center line.

When utilizing a cylindrical surface to surround a cavity, the cylindrical surface represents a single side surfaced. Consequently a pair of opposing surfaces, one of which is surrounded by at least one side surface, represent end surfaces.

Accordingly, the scope of the invention should be determined not the embodiments illustrated, but by the appended claims and their legal equivalents.

I claim:

1. an electro-optic cell comprising:

a first surface separated from and facing a second surface, a single hollow element extending between said first surface and said second surface, said hollow element comprises:

a cavity, a third surface facing said second surface, an opening in said third surface formed by said cavity, said first surface is entirely recessed in said cavity and offset from said opening by a cell gap, at least one side surface extending between said third surface and said first surface to surround said cavity and circumscribing said first surface, said second surface overlaps said third surface covering said opening enabling an electro-optical material to be contained in said cavity.

2. The device of claim 1 wherein said first surface is formed on a first substrate, said second surface is formed on a second substrate.

3. The device of claim 2 wherein said hollow element is a flange formed on said first substrate.

4. The device of claim 3 wherein said electro-optic material contained in said cavity comprises a liquid crystal.

5. The device of claim 4 wherein said liquid crystal material is a cholesteric phase liquid crystal.

6. The device of claim 2 wherein said hollow element is a third substrate comprising a hollow region, said first substrate is inserted in said hollow region and affixed to said third substrate to form said cavity.

7. The device of claim 6 wherein said electro-optic material contained in said cavity comprises a liquid crystal.

8. The device of claim 7 wherein said electro-optic material is a cholesteric phase liquid crystal.

9. An optical projection display device comprising:

an electro-optic cell comprising:

a first surface separated from and facing a second surface, a single hollow element extending between said first surface and said second surface, said hollow element comprises:

a cavity, a third surface facing said second surface, an opening in said third surface formed by said cavity, said first surface is entirely recessed in said cavity and offset from said opening by a cell gap, at least one side surface extending between said third surface and said first surface surrounding said cavity and circumscribing said first surface, said second surface overlaps said third surface covering said opening enabling an electro-optic material to be contained in said cavity, optical means for forming an image of said electro-optic material contained in said cavity.

10. The device of claim 9 wherein said electro-optic material comprises a liquid crystal.

11. The device of claim 10 wherein said liquid crystal material comprises a cholesteric phase liquid crystal.

* * * * *